US010388020B2

(12) United States Patent
Guo et al.

(10) Patent No.: US 10,388,020 B2
(45) Date of Patent: Aug. 20, 2019

(54) METHODS AND SYSTEMS FOR SEGMENTATION OF ORGANS AND TUMORS AND OBJECTS

(71) Applicant: The Trustees of Columbia University in the City of New York, New York, NY (US)

(72) Inventors: Xiaotao Guo, Bronx, NY (US); Binsheng Zhao, Forest Hills, NY (US); Lawrence H. Schwartz, New York, NY (US)

(73) Assignee: The Trustees of Columbia University in the City of New York, New York, NY (US)

( * ) Notice: Subject to any disclaimer, the term of this patent is extended or adjusted under 35 U.S.C. 154(b) by 622 days.

(21) Appl. No.: 14/394,097

(22) PCT Filed: Apr. 11, 2013

(86) PCT No.: PCT/US2013/036166
§ 371 (c)(1),
(2) Date: Oct. 12, 2014

(87) PCT Pub. No.: WO2013/155300
PCT Pub. Date: Oct. 17, 2013

(65) Prior Publication Data
US 2015/0078640 A1 Mar. 19, 2015

Related U.S. Application Data

(60) Provisional application No. 61/622,917, filed on Apr. 11, 2012.

(51) Int. Cl.
*G06T 7/11* (2017.01)
*G06T 7/12* (2017.01)
(Continued)

(52) U.S. Cl.
CPC ............. *G06T 7/12* (2017.01); *G06K 9/0014* (2013.01); *G06K 9/34* (2013.01); *G06T 7/11* (2017.01);
(Continued)

(58) Field of Classification Search
CPC ................. G06T 7/0081; G06T 7/0012; G06T 2207/20152; G06T 7/11; G06T 7/149;
(Continued)

(56) References Cited

U.S. PATENT DOCUMENTS

| | | |
|---|---|---|
| 2004/0153128 A1 | 8/2004 | Suresh et al. |
| 2007/0160277 A1 | 7/2007 | Slabough et al. |

(Continued)

OTHER PUBLICATIONS

Wang et al, A Fast Hybrid Method for Interactive Liver Segmentation, Oct. 21-23, 2010 [retrieved Jul. 22, 2016], 2010 Chinese Conference on Pattern Recognition, 5 total pages. Retrieved from the Internet: http://ieeexplore.ieee.org/xpls/abs_all.jsp?arnumber=5659281&tag=1.*

(Continued)

*Primary Examiner* — Andrew M Moyer
*Assistant Examiner* — Dennis Rosario
(74) *Attorney, Agent, or Firm* — Beusse Wolter Sanks & Maire; Eugene J. Molinelli

(57) ABSTRACT

Techniques for segmentation of organs and tumors and cells in image data include revising a position of a boundary by evaluating an evolution equation that includes differences of amplitude values for voxels on the boundary from a statistical metric of amplitude of voxels inside, and from a statistical metric of amplitude of voxels outside, for a limited region that lies within a distance r of the boundary. The distance r is small compared to a perimeter of the first boundary. Some techniques include determining a revised position of multiple boundaries by evaluating an evolution
(Continued)

equation that includes differences in a first topographical distance from a first marker and a second topographical distance from a second marker for each voxel on the boundary, and also includes at least one other term related to boundary detection.

18 Claims, 14 Drawing Sheets

(51) Int. Cl.
 *G06K 9/00* (2006.01)
 *G06K 9/34* (2006.01)
 *G06T 7/143* (2017.01)
 *G06T 7/149* (2017.01)
(52) U.S. Cl.
 CPC .............. *G06T 7/143* (2017.01); *G06T 7/149* (2017.01); *G06T 2200/24* (2013.01); *G06T 2207/10076* (2013.01); *G06T 2207/10081* (2013.01); *G06T 2207/10088* (2013.01); *G06T 2207/10104* (2013.01); *G06T 2207/10136* (2013.01); *G06T 2207/20104* (2013.01); *G06T 2207/20152* (2013.01); *G06T 2207/30024* (2013.01); *G06T 2207/30056* (2013.01); *G06T 2207/30096* (2013.01)
(58) Field of Classification Search
 CPC ........... G06T 7/136; G06T 2207/10081; G06T 2207/20072; G06T 7/187; G06K 9/0014; G06K 9/342
 See application file for complete search history.

(56) References Cited

U.S. PATENT DOCUMENTS

| | | | |
|---|---|---|---|
| 2007/0165916 A1 | 7/2007 | Cloutier et al. | |
| 2008/0181479 A1 | 7/2008 | Yang et al. | |
| 2008/0317314 A1 | 12/2008 | Schwartz et al. | |
| 2011/0286654 A1* | 11/2011 | Krishnan | G06K 9/0014 382/133 |

OTHER PUBLICATIONS

Lankton et al., Localizing Region-Based Active Contours, Nov. 2008 [retrieved Jul. 22, 2016], IEEE Transactions on Image Processing, vol. 17, No. 11, pp. 2029-2039. Retrieved from the Internet: http://ieeexplore.ieee.org/xpls/abs_all.jsp?arnumber=4636741&tag=1.*
Yan et al., Marker-Controlled Watershed for Lymphoma Segmentation in Sequential CT Images, 2006 [retrieved Jul. 22, 2016], Medical Physics, vol. 33, Issue 7, pp. 2452-2460. Retrieved from the Internet: http://scitation.aip.org/content/aapm/journal/medphys/33/7/10.1118/1.2207133.*
Nguyen et al., Watersnakes: Energy-Driven Watershed Segmentation, Mar. 2003 [retrieved Jul. 22, 2016], IEEE Transactions on Pattern Analysis and Machine Intelligence, vol. 25, Issue 3,pp. 330-342. Retrieved from the Internet: http://ieeexplore.ieee.org/xpls/abs_all.jsp?arnumber=1182096&tag=1.*
Olabarriaga et al., Interaction in the Segmentation of Medical Images: A Survey, Jun. 2001 [retrieved Jul. 22, 2016], Medical Image Analysis, vol. 5, Issue 2, pp. 127-142. Retrieved from the Internet: http://www.sciencedirect.com/science/article/pii/S1361841500000414.*
Park et al., Microscopic Image Segmentation Based on Color Pixels Classification, Nov. 23-25, 2009 [retrieved May 4, 2017], Proceedings of the First International Conference on Internet Multimedia Computing and Service, pp. 53-59. Retrieved from the Internet: http://dl.acm.org/citation.cfm?id=1734622.*
Falcao et al., The Image Foresting Transform: Theory, Algorithms, and Applications, Jan. 2004 [retrieved Jan. 11, 2018], IEEE Transactions on Pattern Analysis and Machine Intelligence, vol. 26, No. 1, pp. 19-29. Retrieved from the Internet: http://ieeexplore.ieee.org/abstract/document/1261076/.*
Nguyen et al., Tracking Nonparameterized Object Contours in Video, Sep. 2002 [retrieved Jan. 11, 2018], IEEE Transactions on Image Processing, vol. 11, No. 9,pp. 1081-1091. Retrieved from the Internet: http://ieeexplore.ieee.org/abstract/document/1036056/.*
Nguyen et al., Shape-Driven Three-Dimensional Watersnake Segmentation of Biological Membranes in Electron Tomography, Apr. 25, 2008 (1st instance) [retriv Oct. 11, 2018], IEEE Trans on Medical Imaging, vol. 27, Issue: 5, May 2008, pp. 616-628. Retriev https://ieeexplore.ieee.org/abstract/document/4384319.*
Rauber et al., Interactive Segmentation by Image Foresting Transform on Superpixel Graphs, Aug. 5-8, 2013 (retrieved Mar. 26, 2019), 2013 XXVI Conference on Graphics, Patterns and Images,pp. 131-138. Retrieved : https://ieeexplore.ieee.org/abstract/document/6656178 (Year: 2013).*
Bergo, Segmentação de displasias corticais focais em imagens de ressonancia magnetica do cerebro humano, 2008 (retrieved Mar. 26, 2019), Thesis [on-line], 114 total pages. Retrieved: http://repositorio.unicamp.br/handle/REPOSIP/276092 (Year: 2008).*
Angelini, Elsa D., et al., "Brain MRI Segmentation with Multiphase Minimal Partitioning: A Comparative Study", "Int J Biomed Imaging", 2007, pp. 1-15, vol. 10526, Publisher: Hindawi Publishing Corp., Published in: http://www .ncbi.nlm.nih.gov/pmc/articles/PMC2211521/pdf/IJBI2007-10526.pdf.
ISA/U.S., "International Search Report and Written Opinion for the corresponding PCT application No. US2013/036166", dated Aug. 6, 2013, pp. 1-8.
Jayadevappa, D., et al., "A Hybrid Segmentation Model based on Watershed and Gradient Vector Flow for the Detection of Brain Tumor", "Int J of Signal Processing, Image Processing and Pattern Recognition", 2009, pp. 29-42, vol. 2, No. 3, Publisher: SERSC, Published in: http://citeseerx.ist.psu.edu/viewdoc/download?doi=10.1.1.177.5721&rep=rep1&type=pdf.
Xu, Jiajing, et al., "Automated temporal tracking and segmentation of lymphoma on serial CT examinations", "Medical Physics", 2011, pp. 5879-5886, vol. 38, No. 11, Publisher: Am. Assoc. Phys. Med., Published in: http://www.stanford.edu/-rubin/pubs/MedPhys-Xu-Rubin-LesionTracking.pdf.

* cited by examiner

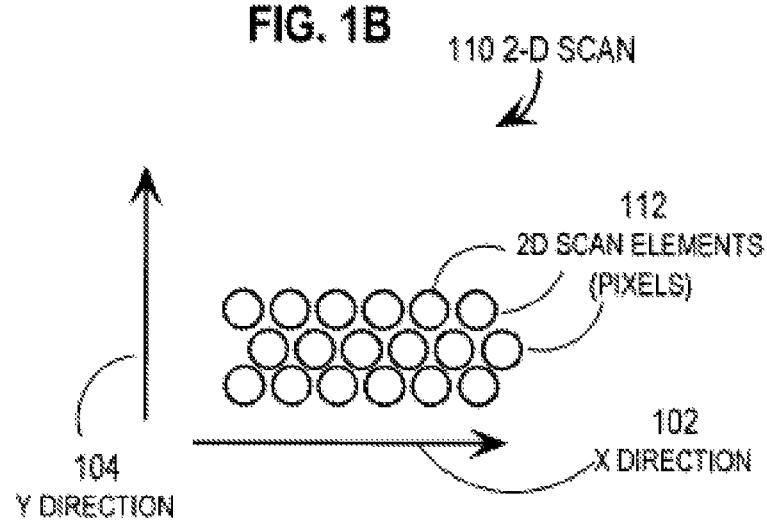
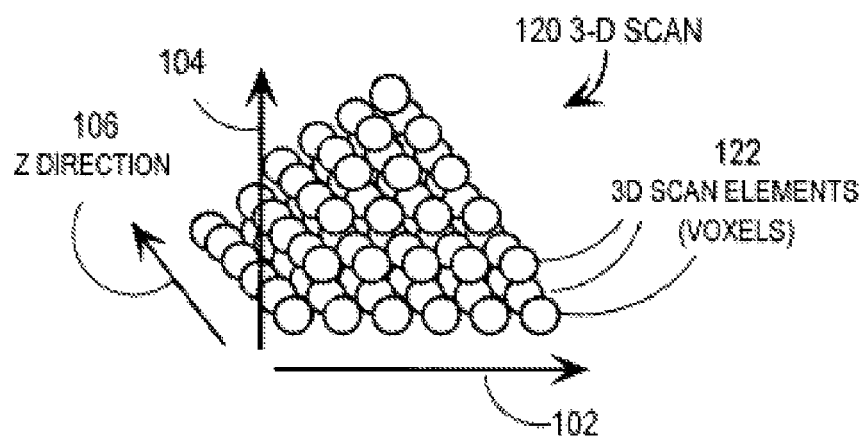

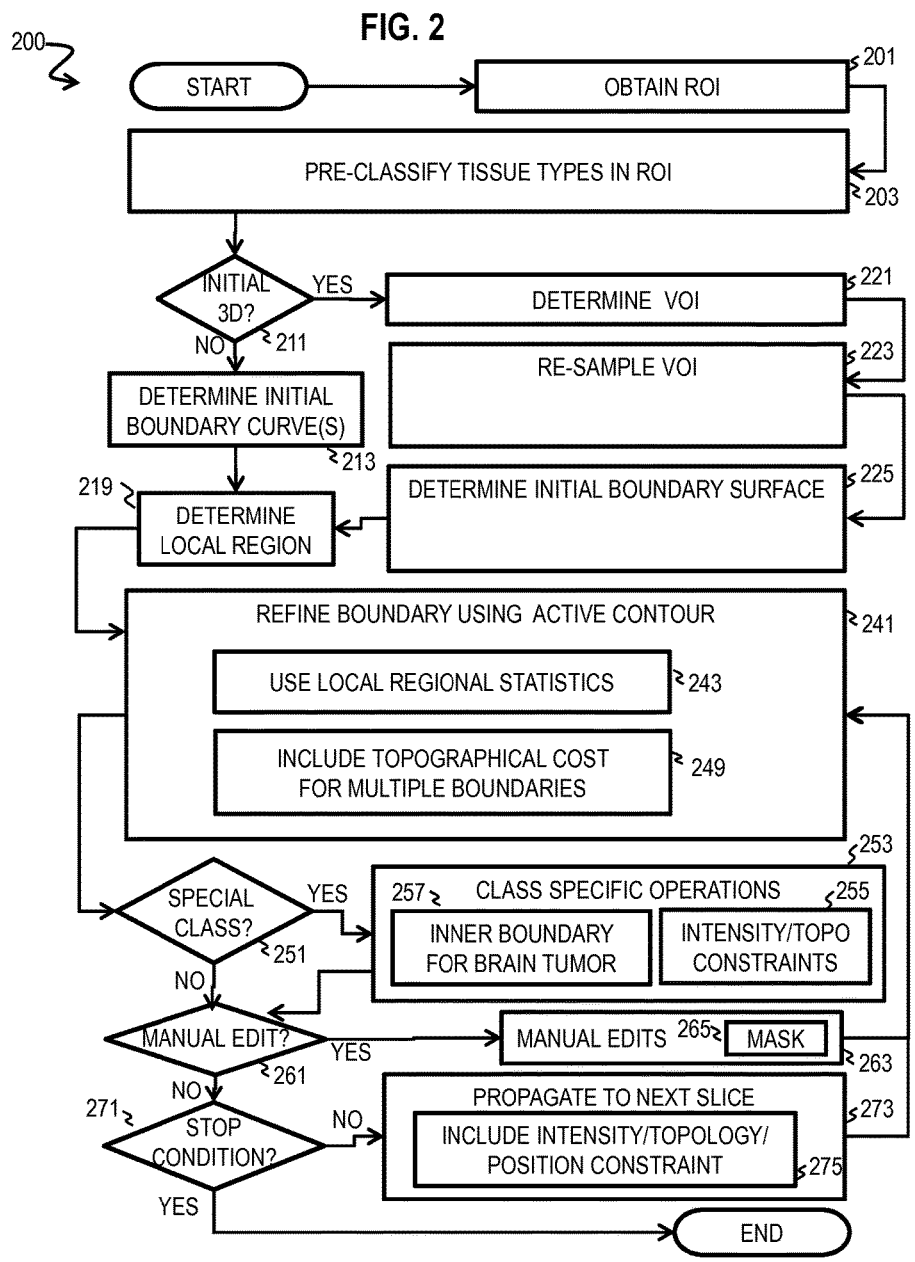

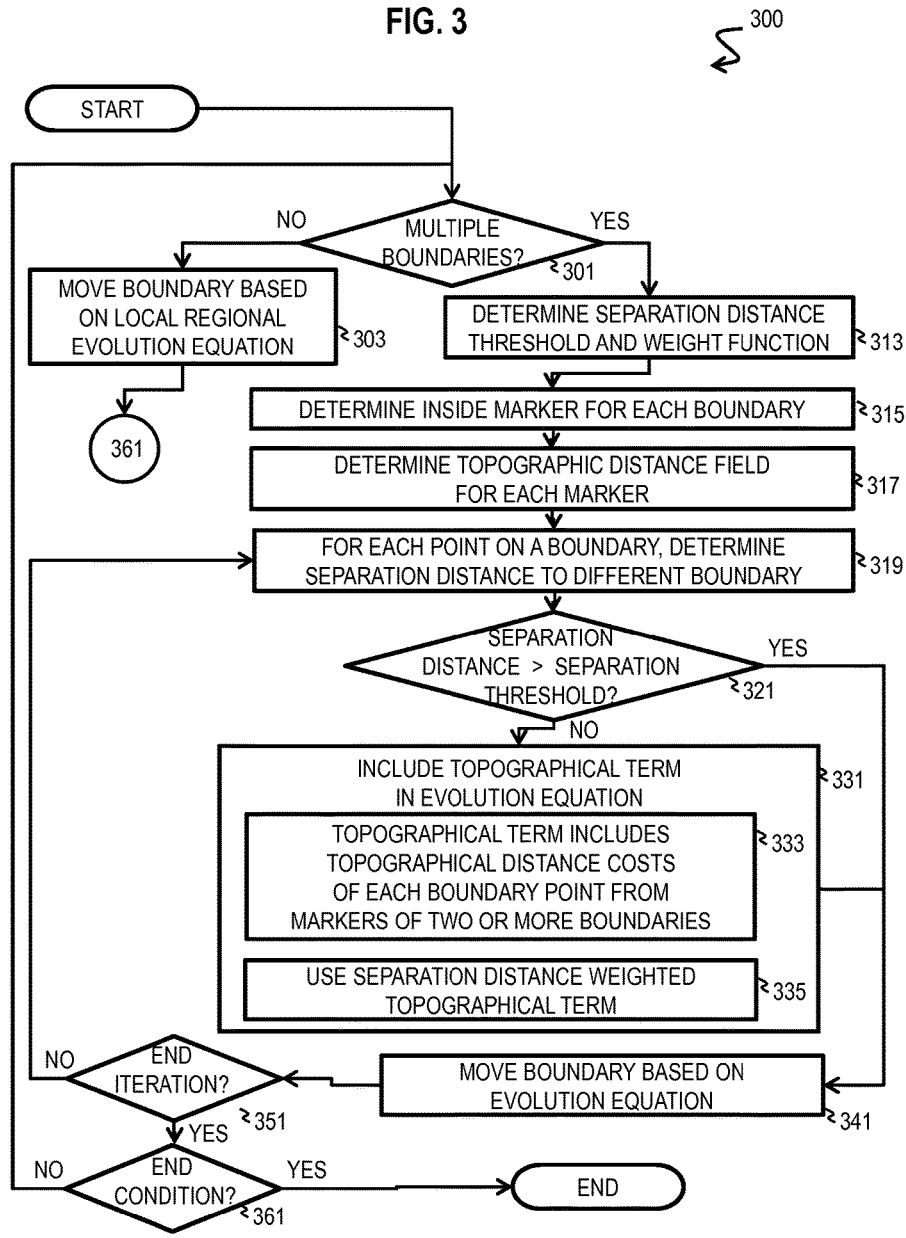

METHODS AND SYSTEMS FOR SEGMENTATION OF ORGANS AND TUMORS AND OBJECTS

CROSS-REFERENCE TO RELATED APPLICATIONS

This application claims benefit of Provisional Appln. 61/622,917, filed Apr. 11, 2012, the entire contents of which are hereby incorporated by reference as if fully set forth herein, under 35 U.S.C. § 119(e).

STATEMENT OF GOVERNMENTAL INTEREST

This invention was made with government support under Grant No. R01CA149490 and U01CA140207 awarded by the National Institutes of Health. The government has certain rights in the invention.

BACKGROUND OF THE INVENTION

Cross sectional imaging is an imaging technique which produces a large series of two-dimensional (2D) images of a subject, e.g., a human subject. Examples of cross sectional imaging techniques include computerized tomography (CT), magnetic resonance imaging (MRI), positron emission tomography (PET), SPECT scanning, ultrasonography (US), among others. A set of cross sectional images for a single patient, e.g., for different axially located cross-sections or for the same cross section at different times can be considered three dimensional (3D) image data, and even four dimensional (4D) image data for combinations of axial and temporal cross sectional images.

Various analytical approaches can be applied to the cross sectional images to detect and highlight portions of the patient's anatomy of interest. For example, the cross sectional images can be processed by segmentation, which generally involves separating objects not of interest from objects of interest, e.g., extracting anatomical surfaces, structures, or regions of interest from the images for the purposes of anatomical identification, diagnosis, evaluation, and volumetric measurements. In detecting tumor changes with therapies, volumetric measurement can be more accurate and sensitive than conventional linear measurements. 3D segmentation of cross sectional images provides a feasible way to quantify tumor volume and volume changes over time.

However, segmentation of primary and metastatic tumors, or certain organs (e.g., liver, spleen and kidney), which can be highly heterogeneous, is challenging. There is a need for accurate and efficient delineation of these objects and measurement of their volumes, e.g., for better therapy response assessment, monitor organ regeneration after transplantation, and to make non-invasive diagnoses in both clinical trials and clinical practice.

SUMMARY OF THE INVENTION

Techniques are provided for effective segmentation of organs and tumors and cells, even if such objects involve heterogeneous properties in cross sectional images. As used herein, the term voxel refers to an element of cross sectional images and is meant to refer to a picture element (pixel) of 2D image data as well as a volume element (voxel) of 3D image data as well as an element of any higher dimensional image data, unless a more restrictive meaning is evident from the context. As used herein, image data means any amplitude values distributed on a 2D or higher dimensional array of voxels, whether measured directly using scanning equipment, or the result of one or more subsequent transformations, such as Fourier Transform, edge detection, amplitude normalization, or shift or other transform or preprocessing.

In a first set of embodiments, a method includes obtaining image data that indicates amplitude values at each of a plurality of voxels; and, obtaining initial boundary data that indicates an initial position of a first boundary associated with a first object represented by the image data and an initial position of a different second boundary associated with a different second object represented by the image data. The method also includes determining a first marker that indicates a first amplitude value inside the first object and determining a second marker that indicates a second amplitude value inside the second object. The method further includes determining a first topographical distance between a voxel on at least one boundary and the first marker, and determining a second topographical distance between the voxel and the second marker. The method then includes determining, a revised position of at least one of the first boundary and the second boundary by evaluating an evolution equation that includes differences in the first topographical distance and second topographical distances for the voxel on the at least one boundary, and also includes at least one other term related to boundary detection.

In a second set of embodiments, a method includes obtaining image data that indicates amplitude values at each of a plurality of voxels, and obtaining initial boundary data that indicates an initial position of a boundary associated with an object represented by the image data. The method further includes determining a revised position of the boundary by evaluating an evolution equation that includes differences of amplitude values for voxels on the boundary from a statistical metric of amplitude of voxels inside the boundary and differences of amplitude values for voxels on the boundary from a statistical metric amplitude of voxels outside the boundary for a limited region that lies within a distance r of the boundary. The distance r is small compared to a perimeter of the first boundary.

In some embodiments of the second set, the method also includes automatically detecting both an inner boundary and an outer boundary based on a single initial boundary that encompasses the outer boundary.

In other sets of embodiments, a computer-readable medium causes an apparatus, or an apparatus or system is configured, to perform one or more steps of one or more of the above methods.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1B is a block diagram that illustrates scan elements in a 2D scan, such as one scanned image from a CT scanner FIG. 1C is a block diagram that illustrates scan elements in a 3D scan, such as stacked multiple scanned images from a CT imager or true 3D scan elements from volumetric CT imagers or ultrasound;

FIG. 2 is a flow chart that illustrates at a high level a method for refining a boundary of one or more tissues, according to an embodiment;

FIG. 3 is a flow chart that illustrates a method for performing a step of the method of FIG. 2 to perform active contour model based on a local regional statistic with topographical effects, according to an embodiment;

DETAILED DESCRIPTION

A method, system, computer-readable medium and apparatus are described for segmenting organs and tumors and cells. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Some embodiments of the invention are described below in the context of segmenting tumors in CT scans. However, the invention is not limited to this context. In other embodiments other imaging modalities, such as MRI, magnetic resonance spectral imaging (MRSI), PET, SPECT, US, microscopy, cytometry imaging, among others, are employed, to accumulate 2D, 3D, 4D or higher dimensionality image data, for segmenting other tissues, organs, tumors or cells, collectively called tissue detection hereinafter.

1. OVERVIEW

Figure 1A:
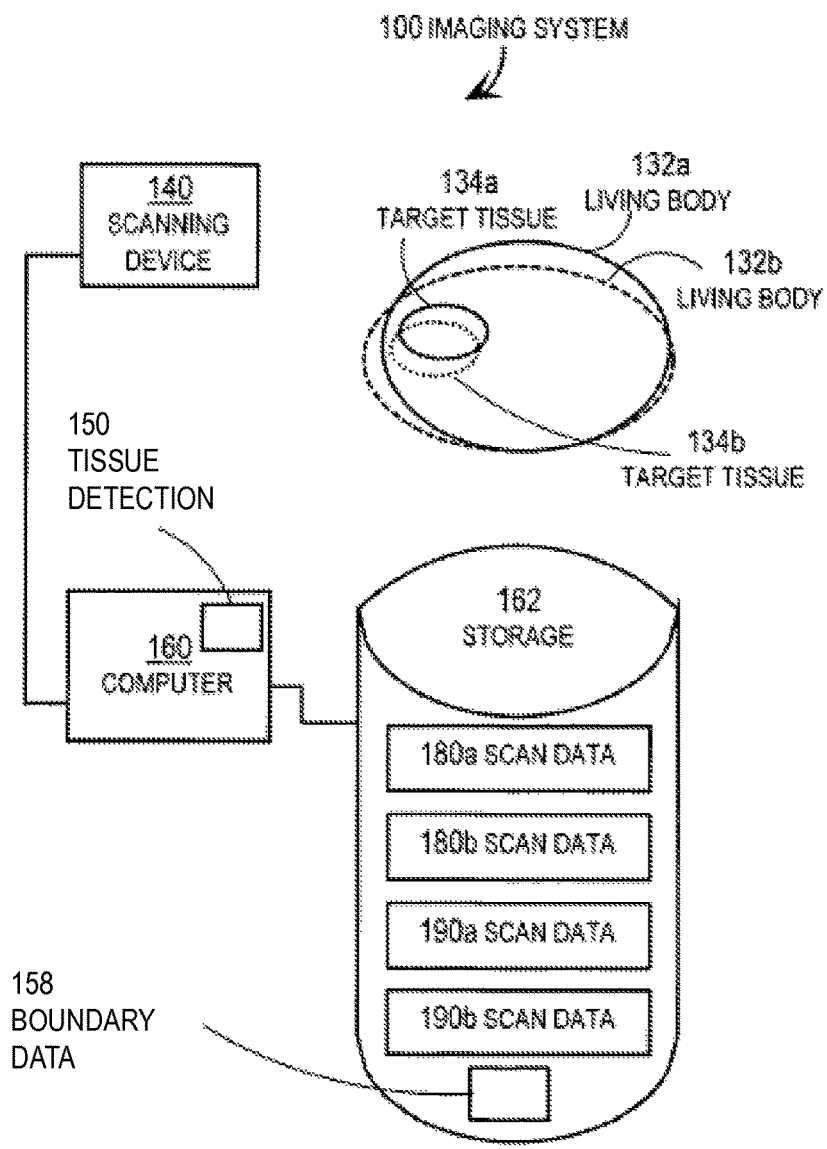
FIG. 1A is a block diagram that illustrates an imaging system for tissue detection, according to an embodiment.

FIG. 1A is a block diagram that illustrates an imaging system 100 for tissue detection, according to an embodiment. The system 100 is designed for determining the spatial arrangement of soft target tissue in a living body. For purposes of illustration, a living body is depicted, but is not part of the system 100. In the illustrated embodiment, a living body is depicted in a first spatial arrangement 132a at one time and includes a target tissue in a corresponding spatial arrangement 134a. At a different time, the same living body is in a second spatial arrangement 132b that includes the same or changed target tissue in a different corresponding spatial arrangement 134b.

In the illustrated embodiment, system 100 includes a scanning device 140, such as a full dose X-ray computed tomography (CT) scanner, or a magnetic resonance imaging (MRI) scanner, among others. In some embodiments, the scanning device 140 is used at one or more different times. The device 140 is configured to produce scanned images that each represent a cross section of the living body at one of multiple cross sectional (transverse) slices arranged along the axial direction of the body, which is oriented in the long dimension of the body.

In system 100, data from the imager 140 is received at a computer 160 and stored on storage device 162. Computer systems and storage devices like 160, 162, respectively, are described in more detail below with reference to FIGS. 13 and 14. Scan data 180*a*, 180*b*, 190*a*, 190*b* based on data measured at imager 140 at one or more different times or axial locations or both are stored on storage device 162. For example, scan data 180*a* and scan data 180*b*, which include scanned images at two slices separated in the axial direction, is stored based on measurements from scanning device 140 at one time. Scan data 190*a*, 190*b*, which include scanned images at two slices separated in the axial direction, is stored based on measurements from scanning device 140 at a different time.

In various embodiments, a tissue detection process 150 operates on computer 160 to determine a boundary between scan elements of scan data which are inside and outside a particular target tissue or cell. The boundary data is stored in boundary data 158 in associations with the scan data, e.g., scan data 180*a*, 180*b*, 190*a*, 190*b*.

Although processes, equipment, and data structures are depicted in FIG. 1A as integral blocks in a particular arrangement for purposes of illustration, in other embodiments ne or more processes or data structures, or portions thereof, are arranged in a different manner, on the same or different hosts, in one or more databases, or are omitted, or one or more different processes or data structures are included on the same or different hosts. For example, although system 100 is depicted with a particular number of scanning devices 140, computers 160, and scan data 180, 190 on storage device 162 for purposes of illustration, in other embodiments more or fewer scanning devices, computers, storage devices and scan data constitute an imaging system for determining spatial arrangement of tissues, including cells.

FIG. 1B is a block diagram that illustrates scan elements in a 2D scan 110, such as one scanned image from a CT scanner. The two dimensions of the scan 110 are represented by the x direction arrow 102 and the y direction arrow 104. The scan 110 consists of a two dimensional array of 2D scan elements (pixels) 112 each with an associated position. Typically, a 2D scan element position is given by a row number in the x direction and a column number in the y direction of a rectangular array of scan elements. A value at each scan element position represents a measured or computed intensity or amplitude that represents a physical property (e.g., X-ray absorption, or resonance frequency of an MRI scanner) at a corresponding position in at least a portion of the spatial arrangement 132*a*, 132*b* of the living body. The measured property is called amplitude hereinafter and is treated as a scalar quantity. In some embodiments, two or more properties are measured together at a pixel location and multiple amplitudes are obtained that can be collected into a vector quantity, such as spectral amplitudes in MRSI. Although a particular number and arrangement of equal sized circular scan elements 112 are shown for purposes of illustration, in other embodiments, more elements in the same or different arrangement with the same or different sizes and shapes are included in a 2D scan.

FIG. 1C is a block diagram that illustrates scan elements in a 3D scan 120, such as stacked multiple scanned images from a CT imager or true 3D scan elements from volumetric CT imagers or MRI or US. The three dimensions of the scan are represented by the x direction arrow 102, the y direction arrow 104, and the z direction arrow 106. The scan 120 consists of a three dimensional array of 3D scan elements (also called volume elements and abbreviated as voxels) 122 each with an associated position. Typically, a 3D scan element position is given by a row number in the x direction, column number in the y direction and a scanned image number (also called a scan number) in the z (axial) direction of a cubic array of scan elements or a temporal sequence of scanned slices. A value at each scan element position represents a measured or computed intensity that represents a physical property (e.g., X-ray absorption for a CT scanner, or resonance frequency of an MRI scanner) at a corresponding position in at least a portion of the spatial arrangement 132*a*, 132*b* of the living body. Although a particular number and arrangement of equal sized spherical scan elements 122 are shown for purposes of illustration, in other embodiments, more elements in the same or different arrangement with the same or different sizes and shapes are included in a 3D scan.

The term voxels is used herein to represent either 2D scan elements (pixels) or 3D scan elements (voxels), or 4D scan elements, or some combination, depending on the context.

Amplitude is often expressed as one of a series of discrete gray-levels. A grey-level image may be seen as a topographic relief, where the grey level of a voxel is interpreted as its altitude in the relief. A drop of water falling on a topographic relief flows along a path to finally reach a local minimum. Intuitively, the watershed of a relief corresponds to the limits of the adjacent catchment basins of the drops of water. For segmentation purposes, it is common to interpret the horizontal gradient of the grayscale image as elevation information. The horizontal gradient is expressed as a two element vector at each voxel, the magnitude and direction of the steepest increase in amplitude from the voxel to any of its neighbors. In various lattices, a voxel may have one, two, four, six, eight or more neighbors. Intuitively, a drop of water falling on a topographic relief flows towards the "nearest" minimum. The "nearest" minimum is that minimum which lies at the end of the path of steepest descent. In terms of topography, this occurs if the point lies in the catchment basin of that minimum. The length of that path weighted by the altitude drop is related to the topographical distance, as described in more detail below.

FIG. 2 is a flow chart that illustrates at a high level a method 200 for refining a boundary of one or more tissues, according to an embodiment. Although steps are depicted in FIG. 2, and in subsequent flowcharts FIG. 3 and FIG. 4A and FIG. 4B, as integral steps in a particular order for purposes of illustration, in other embodiments, one or more steps, or portions thereof, are performed in a different order, or overlapping in time, in series or in parallel, or are omitted, or one or more additional steps are added, or the method is changed in some combination of ways.

In step 201, a region of interest (ROI) is obtained. The advantage of an ROI is that large sections of the image data can be ignored during processing and the number of special cases that have to be handled by the processing is often greatly reduced. Any method may be used to obtain the ROI, including receiving data from an operator, either unsolicited or in response to a prompt, or retrieving a mask that indicates a one in voxels that are within the ROI and a zero elsewhere, from a storage device on a local or remote computer, at a fixed location or a location indicated by a user or program operating on a remote computer, either in response to a request or unsolicited. In some embodiments, the ROI is defined by a user, such as a radiologist viewing the images on a display device, e.g., by drawing using a pointing device (such as a computer mouse), on a reference slice of the images such that the ROI encloses the target tissue (such as a lesion or cell) to be segmented. In various embodiments, the ROI includes both the target tissue and a portion of the background.

In some embodiments, the ROI is also generated by parameters provided by a user. For example, the user can specify a center on the reference image, and provide a pixel value and a radius, then a circular ROI can be automatically generated. Similarly, an elliptical ROI, can be generated by providing the center of the ellipse and the lengths of its major and minor axes. ROI of other shapes can be generated in similar manner. In alternative embodiments, the ROI is automatically generated based on a number of selected points near a target boundary specified by the user. If the ROI does not enclose the target, it can be dilated to enclose the target, in response to further user commands. In some embodiments, an ROI is not involved; and, step 201 is omitted.

In step 203, tissue types in the ROI are classified, at least preliminarily. For example, it is specified that the target tissue is a particular organ or tumor therein, such as liver or brain or lung or lymph node. In some embodiments, the specification is made by a user in response to a prompt provided at a graphical user interface. In some embodiments, step 203 includes classifying one or more voxels within the ROI as one or more tissue types. For example, voxels that constitute a background to tissues of interest are classified as background voxels. Any method may be used to classify voxel during step 203. For example, prior knowledge as to the location or amplitude range of one or more target tissues or background are used to classify one or more voxels in the ROI. In some embodiments, cluster analysis of voxel amplitudes or amplitude statistics are used to classify one or more voxels during step 203. In some embodiments, classification of voxels as one or more tissue types is not involved; and, step 203 is omitted.

Steps 211 through 225 are directed to determining an initial positions for one or more boundaries of a corresponding one or more target tissues (including target cells). In step 211, it is determined whether the initial boundary is to be determined in a two dimensional slice or a higher dimensional subset of the image data. In the illustrated embodiment, it is determined whether the initial boundary is to be determined in three dimensions or not. If not, then in step 213 one or more initial boundary curves in two dimensions are determined. For example in some embodiments, a user draws an initial boundary in or near the target tissue of interest. In other embodiments, the initial boundary is based on an approximate segmentation technique, such as a watershed method with internal and external markers. The watershed transform with internal and external markers is well known in the art and described, for example, in L. Vincent and P. Soille, "Watersheds in digital spaces: an efficient algorithm based on immersion simulations," *IEEE Transactions On Pattern Analysis And Machine Intelligence*, v.13 (6), pp 583-598, June 1991. In some embodiments, the initial one or more boundaries are determined for a single subset of voxels in the image data, called a reference subset, such as on a reference slice at one axial position and moment in time. As used herein, a single slice of multiple slices at different axial positions or times or some combination is called a subset of the image data. A subset of the image data can also include other collections of voxels fewer than the entire set of voxels in the image data, whether on the same slice or same time or not.

If it is determined in step 211 that the initial boundary is to be determined in three dimensions, then in step 220 a volume of interest (VOI) is determined. In the illustrated embodiment, the VOI is determined automatically based on the size of the ROI and the distance of the subset from the subset on which the ROI is defined, such as one slice. In other embodiments, the VOI is based, at least in part, on input received from a user.

In step 223, voxels within the VOI are sampled differently from the original voxels (are re-sampled). For example, in some embodiments the voxels in the VOI are super sampled by interpolating amplitudes at positions other than those in the original image data. In some embodiments, amplitudes from several voxels are grouped by selecting an average, median, maximum, minimum or some other statistic of the several voxels being grouped.

In step 225, one or more initial boundary surfaces are determined in three or more dimensions. For example, in some embodiments a user draws an initial boundary in or near the target tissue of interest. In other embodiments, the initial boundary is based on an approximate segmentation technique, such as a watershed method with internal and external markers extended to three dimensions or more. In some embodiments, the initial one or more boundaries are determined for a single subset of voxels in the image data, called a reference subset, such as one or more of several slices along an axial position or at one or more moments in time.

The shape of the initial contour depends on the object to be approximated, and can be arbitrary to trace the boundary of the object on the reference image. Domain knowledge of the nature of the image and how it was taken can be relied upon for drawing the initial contour. The initial contour can also be generated automatically based on prior knowledge, such as anatomical position, in certain circumstances. The initial contour can be inaccurate for the true object boundary, and can be fully inside or fully outside the true object boundary, or can have intersections with the true object boundary. The initial contour can be drawn by an operator with a mouse or other input device. If the object of interest has multiple connected components (e.g., the left kidney and right kidney), the initialization can be realized by drawing multiple contours, each roughly enclosing the individual component, so that the multiple components can be segmented simultaneously. The reference image can be selected based on the position of the image slice (e.g., in the middle of the cross sectional images for the tumor or organ) or an image in which the tumor or organ has a relatively large area.

In some embodiments, a local region-based active contour method is used, as described in more detail below. In such embodiments, a local region in the vicinity of the initial boundary is defined during step 219. The local region is within a distance r of the current boundary, where r is small compared to a perimeter of the current boundary. The distance r should also be large enough to include a sufficient number of voxels to provide good estimates of statistical properties of the image in the vicinity, such as about 10 voxels or more. An advantage of the localized region-based active contour method is that objects which have heterogeneous statistics can be successfully segmented with localized energies as long as the initialization is close enough to the true object boundary. Another advantage is increased computational efficiency. In some embodiments that do not use local region-based active contour method, step 219 is omitted.

In various embodiments, the local region assumes any shape with roughly balanced inside and outside regions at each side of the evolving boundary. In some embodiments, the localized region-based active contour method use a local region in which the center point is located on the evolving curve and the radius specified by r. In some embodiments, the local region takes the form of a band or strip extending on both sides of the current contour.

In various embodiments, the value of r is predefined or automatically determined based on the length of the current contour or the region inside the contour, for example, $r = \alpha \cdot P$, or $r = \alpha \sqrt{A}$, where P denotes the perimeter, A denotes the interior area of the region inside the contour, $\alpha$ is a positive parameter in a range from about 0.01 to about 1.0, which is determined by experiment based on different image data and target objects. In some embodiments, r is selected within a range defined by a maximum value $r_{max}$ and a minimum value $r_{min}$. Here, $r_{max}$ is selected (e.g., about 100 voxels) in order to not include too many voxels in the local region, whereas $r_{min}$ is selected to ensure a sufficient number of voxels (e.g., greater than about 5) to provide good estimates of statistical properties of the image in the local region. In some embodiments, r is selected based on distance d from a voxel on the boundary to a centroid of the boundary, $r = \beta d$, $\beta$ is a positive parameter in a range from about 0.01 to about 2.0, which is determined by experiment based on different image data and target objects.

In step 241, the position of the one or more boundaries are refined using an active contour model. An active contour model involves a moveable boundary where movement of the boundary is based on a differential equation called an evolution equation. In some embodiments, the evolution equation is a solution to a cost or energy minimization problem. For example, in some embodiments, the evolution equation is based on minimization of an energy functional that assigns a cost to properties of a boundary that deviate from desired properties for the boundary. A typical energy functional includes a cost for distance from a maximum gradient, a cost for lack of smoothness, or a cost for deviations from an average intensity on one or both sides of the boundary, among other terms. Any active contour model may be used. As described in more detail below with reference to FIG. 3 and FIG. 4A and FIG. 4B, in some embodiments, the energy functional is based on the use of local regional statistics in step 243, or includes a topographical cost for multiple boundaries in step 249, or some combination.

In step 251, it is determined whether the current boundary describes a special class of tissue that received particular, class-specific treatment. For example, in some embodiments, lung tissue, brain tissue and liver tissue receive class-specific treatments, either during definition of the initial boundary or during or after refinement. If so, then control passes to step 253. In step 255, class-specific operations are performed. In some embodiments, step 253 includes step 255 to determine the boundary of tissue, such as the liver or other organs, in which the boundaries are known to satisfy some intensity constraint or size and shape constraints (called topological constraints, herein) or position constraints, or some combination, as described in more detail below. In some embodiments, step 253 includes step 257 to determine an inner boundary for a tumor in brain tissue, as described in more detail below with reference to FIG. 11 and FIG. 12.

In step 261, it is determined whether there are to be any manual edits. For example, the current boundary is presented to a user along with a graphical user interface, which the user can operate to indicate a manual edit to be performed. If so, control passes to step 263 to receive commands from a user that indicate one or more manual edits to be performed. After manual editing, the edited boundary may be used directly or propagated to another subset or sent back for further refinement. For example, the user can use a pointing device to move a portion of the boundary, or mark a boundary as suitable for propagation in one or more directions to other or adjacent subsets of the image data. In the illustrated embodiment, the edited boundary is refined by passing the manually edited boundary back to step 241. In some embodiments, only a portion of the boundary in a vicinity of the user edits is included in the refinement during step 241, so step 263 includes determining a mask in step 265. The mask indicates where the current boundary may be refined (e.g., where the voxels of the mask hold a first value, such as "1") and where the current boundary may not be changed (e.g., where the voxels of the mask hold a different second value, such as "0").

Figure 8:
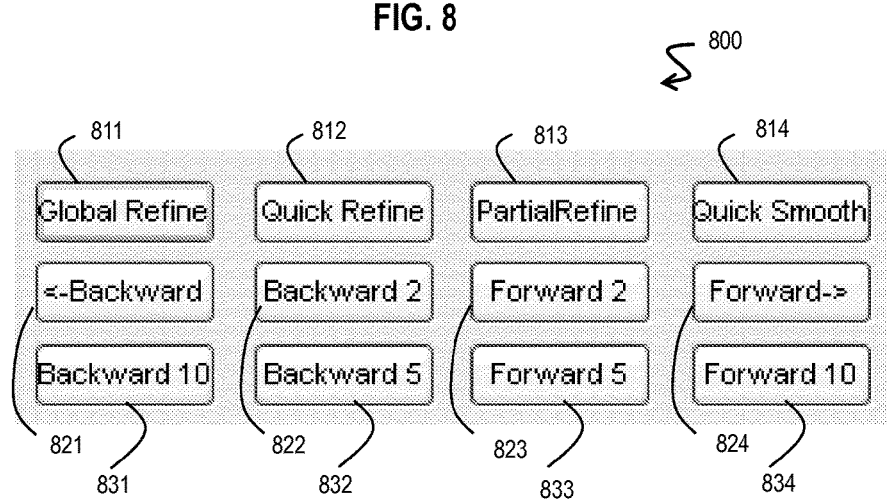
FIG. 8 is a block diagram that illustrates an example graphical user interface for controlling active contour model, according to an embodiment.

FIG. 8 is a block diagram that illustrates an example graphical user interface (GUI) 800 for controlling active contour model, according to an embodiment. FIG. 8 is thus a diagram that illustrates an example screen on a display device, according to one embodiment. The screen includes one or more active areas that allow a user to input data to operate on data. As is well known, an active area is a portion of a display to which a user can point using a pointing device (such as a cursor and cursor movement device, or a touch screen) to cause an action to be initiated by the device that includes the display. Well known forms of active areas are stand alone buttons, radio buttons, check lists, pull down menus, scrolling lists, and text boxes, among others. Although areas, active areas, windows and tool bars are depicted in FIG. 8 as integral blocks in a particular arrangement on a particular screen for purposes of illustration, in other embodiments, one or more screens, windows or active areas, or portions thereof, are arranged in a different order, are of different types, or one or more are omitted, or additional areas are included or the user interfaces are changed in some combination of ways.

The GUI 800 includes active areas 811, 812, 813, 814, 821, 822, 823, 824, 831, 832, 833 and 834. When activated, Global Refine active area 811 causes an apparatus or system to refine every boundary in the current subset of the image data, such as an individual slice. For example, in response to activation of Global Refine active area 811, control passes to step 241 to perform a global region-based active contour method, described above. When activated, Quick Refine active area 812 causes an apparatus or system to perform a local region-based active contour method on every boundary in the current subset of the image data. When activated, Partial Refine active area 813 causes an apparatus or system to perform local region-based active contour method on a portion of the current subset, e.g. as indicated by a mask. When activated, Quick Smooth active area 814 causes an apparatus or system to smooth a boundary in the current subset of the image data, for example by performing an active contour model with a large weight for a smoothness term and restricting r to be very small, e.g., about 5 voxels.

When activated, Backward active area 821 causes an apparatus or system to propagate a boundary from the current subset of image data to an adjacent subset of image data in a particular direction, e.g., toward the toes of a human subject. When activated, Backward 2 active area 822 causes an apparatus or system to propagate a boundary from the current subset of image data to a different subset of image data adjacent to an adjacent subset in the particular direction. Similarly, when activated, Backward 5 active area 832 or Backward 10 active area 831 causes an apparatus or system to propagate a boundary from the current subset of image data to each successive adjacent subset of image data up to five subsets away, or 10 subsets away, respectively, in the particular direction.

When activated, Forward active area 824 causes an apparatus or system to propagate a boundary from the current subset of image data to an adjacent subset of image data in a direction opposite to the particular direction, e.g., toward the head of a human subject. When activated, Forward 2 active area 824 causes an apparatus or system to propagate a boundary from the current subset of image data to a different subset of image data adjacent to an adjacent subset opposite the particular direction. Similarly, when activated, Forward 5 active area 833, or Forward 10 active area 834, causes an apparatus or system to propagate a boundary from the current subset of image data to each successive adjacent subset of image data up to five subsets away, or 10 subsets away, respectively, in the opposite direction.

Returning to FIG. 2, in step 271, it is determined whether some stop condition is satisfied. For example, it is determined whether the entire volume of interest has been segmented. If so, the process ends. In some embodiments, the refinement-propagation is iterated for each slice within a volume of interest (VOI) until each slice of the VOI is processed. The VOI can be defined by the first and last images that enclose the entire object, and is specified in step 221. The propagation can also be terminated automatically using certain criteria, such as based on a pre-defined minimum size or intensity range of the segmented object on the current image, or the average intensity difference between the segmented object on a reference image (or on the previous image) and that on the current image.

If instead, it is determined in step 271 that manual input during step 263 indicates that a boundary is ready for propagation or that subsets of the image data within the volume of interest remained un-segmented, then the stop condition is not satisfied. If it is determined that a stop condition is not satisfied, then in step 273 the boundary is propagated to another or adjacent subset, such as the next slice in an axially displaced position or at the next moment of time. In some embodiments, the propagation is performed in two directions separately from the reference image: one towards the head direction and the other towards foot or toes direction. For example, the refined contour on one image can be projected on the next image in the propagation direction, which can be simply duplicated from the single previous slice, or based on the predication model based on all the previous segmentation contours. In some embodiments, the propagated contour is refined using a similar active contour method, e.g. by passing control back to step 241. In some embodiments, step 273 includes step 275.

In step 275 the boundary is propagated to the other or adjacent subset in such a way as to satisfy an intensity constraint, a typology constraint, or a position constraint, or some combination. For example, if the liver is being segmented, an intensity range associated with the liver is used to exclude any pixels or voxels within the boundary that fall outside the accepted intensity range. For example in CT data, liver tissue falls largely within a range from about 0 to about 250 Hounsfield units (HU). Similarly, boundaries that form any shape or size outside the range expected for the target tissue in the current subset are excluded by the topology constraints. Furthermore, in some embodiments, boundaries that are positioned outside the range expected for a particular target tissue are also excluded. For example in CT or MR data, when segmenting a left kidney in axial view, which is approximately located in the right half of the image, if some of the segmentation results fall largely on the other half of the image, then those parts can be removed.

After propagation to the next subset, the boundary or boundaries on the new subset, and not excluded by the constraints of step 275, are refined using an active contour model, such as in step 241.

In some embodiments, the segmentation result is thus further analyzed to improve the accuracy of the result. Prior knowledge or available information about the objects, such as intensity range, position, or shape, are exploited and integrated into the method to improve the performance of the method. For example, regions having a statistical quantity of intensities exceeding a predetermined value or range can be excluded from the segmentation result. In the case of the liver, for each slice, the intensity statistics inside the boundary, such as mean $\mu_0$ and standard deviation $\sigma_0$, is calculated. Those statistics are then used to set thresholds $T_{low}$ and $T_{high}$, which are utilized, for example in step 255 in some embodiments, to exclude some portion of the images from the segmentation result. For instance, the pixels whose intensity values are either below the threshold $T_{low}$ or above the threshed $T_{high}$, are excluded from the segmentation result. In some embodiments, the empirical threshold has the form given by Equation 1.

$$T_{low}=\mu_0-\alpha_1\sigma_0, T_{high}=\mu_0+\alpha_2\sigma_0, \qquad (1)$$

where $\alpha_1$ and $\alpha_2$ are positive parameters that are selected empirically. For example, for liver data in CT, $\alpha_1$ is selected advantageously in the range from about 1.0 to about 2.0, and $\alpha_2$ is selected advantageously in the range from about 1.0 to about 3.5.

More sophisticated models, such as the Gaussian mixture model, are also employed, in some embodiments, to evaluate the statistics of the largest component. The Gaussian mixture model is used in these embodiments as a more robust estimate of statistics of the organ. For example, in liver segmentation, the two component Gaussian mixture model gives a more accurate estimate of the mean $\mu_0$ and standard deviation $\sigma_0$ of liver parenchyma, which is a large component. The threshold determined using Equation 1 is used to exclude adjacent organs, such as heart, stomach, or kidney.

In some embodiments, the described procedure also includes preprocessing the original set of image data to remove the portions of voxels or pixels not of interest in step 201. For example, for liver segmentation in CT images, the Hounsfield value of the CT intensity is used to preproccess the original images. Some organs (e.g., lung, fat or bone), have distinct Hounsfield range from the liver, and are separated by simple thresholding techniques. Thus, the techniques herein can integrate the above thresholding techniques into both segmentation and refinement process.

Prior knowledge or available information of the shape and position of the objects is also used, in some embodiments, to eliminate possible inaccuracies during propagation of the contour from one slice to another. For example, in the case of the liver, there is usually one connected component in the superior part of the liver. Therefore, during step 273, when the boundary is propagating towards the direction of the head, the connected components of the segmented results is first labeled and analyzed based on properties such as area or centroid. The labeled objects which has an area larger than a specified threshold and where the centroid falls into the specified range is selected as a candidate of true liver tissue. This, avoids, for example, the heart being mistaken as part of the liver. In the same fashion, when the boundary is propagating during step 273 towards the direction of the toes, the centroid of the connected components is used to exclude some of the non-target tissues; because, in the inferior part of the liver, the centroid of the contour often falls over the left side of the image. Additionally, the average amplitude value in a labeled object, in some embodiments, is compared to the average amplitude μ and standard deviation σ of a reference image. The labeled object can be excluded if it is beyond a specified range. For example in some organ segmentation, an amplitude range is specified as from about $\mu-\alpha\sigma$ to about $\mu+\alpha\sigma$, where α is a positive parameter in the range from about 1.5 to about 3.

FIG. 3 is a flow chart that illustrates a method 300 for performing a step 241 of the method of FIG. 2 to perform active contour model based on a local regional statistic with topographical effects, according to an embodiment. Thus method 300 is a particular embodiment of the step 241.

In step 301, it is determined whether there are multiple boundaries within the region of interest ROI or the volume of interest VOI. The multiple boundaries may be the result of the initial boundary determination in step 213 or step 225, or the result of a previous active contour model refinement during a previous execution of step 241 or previous user inputs, such as in manual edit step 263, or previous class specific operations in step 253, or propagation from a previous subset during step 273. If not, control passes to step 303 to move the boundary by a local regional evolution equation.

2. LOCAL REGION-BASED ACTIVE CONTOUR METHOD

Figure 5:
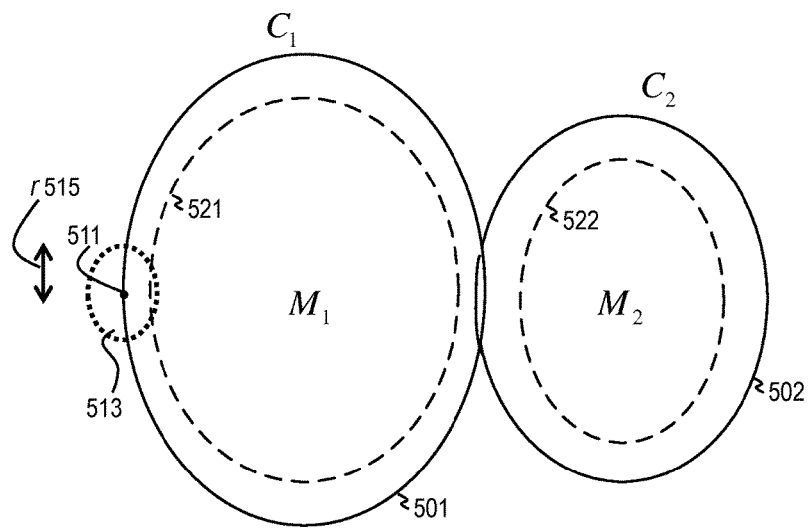
FIG. 5 is a block diagram that illustrates an example initial boundary, local region and example marker for each of two objects represented in image data for computing topographical effects, according to an embodiment.

FIG. 5 is a block diagram that illustrates an example initial boundary, local region and example marker for each of two objects represented in image data for computing topographical effects, according to an embodiment. Two initial boundaries are depicted as curves C1 501 and curve C2 502. A local region 513 of a point 511 on boundary C1 501 is depicted as a dotted ellipse with major axis 515 given by the distance r described above with respect to step 219, such that every point in local region 513 is within the distance r of the boundary C1. Although an ellipse is depicted for purposes of illustration, in other embodiments, the local region assumes a different shape, such as a circle, square, rectangle or band parallel to the curve C1, among others. FIG. 5 also shows a marker M1 region 521 that defines points inside the curve C1 used with the watershed transform to provide the initial boundary C1. Similarly, FIG. 5 depicts a second initial boundary C2 502 of a second object with a second marker M2 522. Note that the initial boundaries C1 501 and C2 502 intersect and their enclosed regions thus overlap. It is desirable that multiple contours evolve to eliminate such intersections.

In some embodiments, the local regional evolution equation is determined during step 303 as described here. Parameterized edge-based active contour model, originally proposed by M. Kass, et al., 1988, is a powerful segmentation model based on energy minimization. The energy term consists of two components: one is used for adjusting smoothness of the curve, and another one is used to attract the contour toward the object boundary. Another typical edge-based model is the geodesic active contour model proposed by Caselles et al., 1997. It also has a level set formulation. Topology change can be naturally handled. The classic regional segmentation model is based on minimizing the Mumford-Shah functional (Mumford et al., 1989), which models the segmentation problem as an optimal approximation by piecewise smooth functions. Later, Chan et al, 2001, proposed a piecewise constant regional active contour mode, based on reduced Mumford-Shah energy functional. The initialization can be far away from the object boundary. It can detect objects whose boundaries are not necessarily defined by gradient or with very smooth boundaries. We will call it the Chan-Vese model. It can also be formulated using level set method of Osher et al, 1988.

In the level set method, the curve C is represented implicitly via a continuous Lipschitz function φ, by C={(x, y)|φ(x, y)=0}, and the evolution of the curve is given by the zero-level curve at time t of the function φ(t, x, y). Evolving the curve C in normal direction with speed F amounts to solving the differential equation given by Equation 2a $$\frac{\partial \phi}{\partial t} = F|\nabla \phi|, \qquad (2a)$$

$$\phi(0, x, y) = \phi_0(x, y),$$

where the set $\{(x, y)|\phi_0(x, y)=0\}$ defines the initial contour.

Using level set representation, the energy functional $F(c_1, c_2, \phi)$ in the Chan-Vese regional model is defined by Equation 2b.

$$F(c_1,c_2,\phi)=\mu\int_\Omega \delta(\phi(x,y))|\nabla\phi(x,y)|dxdy+\nu\int_\Omega H(\phi(x,y))dxdy+\lambda_1\int_\Omega |u_0(x,y)-c_1|H(\phi(x,y))dxdy+\lambda_2\int_\Omega |u_0(x,y)-c_2|(1-H(\phi(x,y)))dxdy \qquad (2b)$$

where $\mu \geq 0$, $\nu \geq 0$, $\lambda_1, \lambda_2 \geq 0$ are fixed parameters, the constants $c_1$ and $c_2$, depending on C, are the averages of $u_0$ inside C and respectively outside C. H is the Heaviside function, and $\delta_0$ is the one-dimensional Dirac measure, given in Equation 3a and 3b, respectively.

$$H(z) = \begin{cases} 1, & \text{if } z \geq 0 \\ 0, & \text{if } z < 0 \end{cases} \qquad (3a)$$

$$\delta_0(z) = \frac{d}{dz} H(z) \qquad (3b)$$

The evolution equation for φ(t, x, y) can be derived as Equation 4

$$\frac{\partial \phi}{\partial t} = \delta(\phi)\left[u \, div\left(\frac{\nabla \phi}{|\phi|}\right) - v - \lambda_1 |u_0(x, y) - c_1|^2 + \lambda_2 |u_0(x, y) - c_2|^2\right] \qquad (4)$$

The first term in the bracket is a smoothness term. Ignoring the expanding term ν, the data attachment term, $[-\lambda_1|u_0(x, y)-c_1|^2+\lambda_2|u_0(x,y)-c_2|^2]$, can be interpreted as a "force", pushing the evolving curve toward the object boundary where the intensity on either side of the boundary most closely matches the average intensity on either side. We will call it statistics force, since it involves statistics estimation over the regions inside and outside C. The term was also used in the region competition segmentation model, in which the statistics force is expressed in terms of function of the probability distribution.

The constants $c_1$ and $c_2$ in Equation 2b are the global mean intensities of the entire interior and exterior regions defined by C, respectively. However, techniques that attempt to model regions using global statistics will encounter difficulties in attempting to handle heterogeneous object that may share nearly the same global statistics for the foreground and background. Incorporating localized statistics into the variational framework can improve segmentation. This can be achieved, in some embodiments, by introducing a characteristic function in terms of a radius parameter r[5]

$$B(x, y) = \begin{cases} 1, & \|x - y\| < r \\ 0, & \text{otherwise} \end{cases} \quad (5)$$

This function will be 1 when the point y is within a ball of radius r centered at x, and 0 otherwise. In other embodiments, B is defined differently to emulate an ellipse, rectangle, square, or band parallel to the boundary, or some other local area.

The localized version of means, $c_{1x}$ and $c_{2x}$ can be easily computed as given by Equation 6 and Equation 7, respectively.

$$c_{1x} = \frac{\int_\Omega B(x, y) H(\phi(x, y)) u_0(x, y) dxdy}{\int_\Omega B(x, y) H(\phi(x, y)) dxdy} \quad (6)$$

$$c_{2x} = \frac{\int_\Omega B(x, y)(1 - H(\phi(x, y))) u_0(x, y) dxdy}{\int_\Omega B(x, y)(1 - H(\phi(x, y))) dxdy} \quad (7)$$

In other embodiments, besides the averages $c_{1x}$, $c_{2x}$, other statistical metrics of the voxel amplitudes in an area inside or outside the boundary are used, such as median, certain percentile, minimum, maximum, variance, standard deviation, skewness, or other parameter or model fits to the distribution of amplitudes are used. The advantage of the local regional active contour model is that objects which have heterogeneous statistics can be successfully segmented with localized energies in certain circumstance as long as the initialization is close enough to the true object boundary. In addition, the computational speed is much faster than using regional statistics.

3. TOPOGRAPHICAL EFFECTS IN ACTIVE CONTOUR MODEL

In general, when multiple boundaries are involved, there are two situations to consider. (1) When n (n>1) objects of interest are spatially disconnected on the image, segmentation can be achieved by using a single level set function to represent the evolving contour, which can be initialized by manually drawing a closed curve that roughly encloses all the objects on the reference image. Global region-based active contour method, such as the active contour model proposed by Chan-Vese, can be used to guide the evolution of the curve. In some embodiments, the local region-based active contour method is used instead of the global region-based active contour method. At the end of the evolution, n connected components are automatically identified, each being represented by a level set function $\phi_i$ (i=1 . . . n). (2) When m (1<m<=n) out of the n objects of interest are spatially connected on the image, in addition to a manually-determined (closed) curve enclosing all of the n objects (this is desired only when m<n), manual initialization for each of the connected objects is performed, e.g., by drawing an initial (closed) curve near the boundary of each object. The initialization can be overlapped for multiple objects, such as depicted in FIG. 5, provided each is close to the boundary of the objects of interest.

To resolve the multiple objects on the image, an active contour model method is utilized, in some embodiments, that is based on, but modifies, area or edge-based active contour model methods, such as the traditional Chan-Vese active contour method or the local region-based active contour method described above. Such a model is modified to incorporate information regarding the proximity among the multiple object contours. In such embodiments, the initial contours for the multiple objects as provided above are evolved cooperatively to avoid the intersection of different objects. For example, the energy functional for the active contour is modified to include terms that relate to the proximity among the multiple object contours.

In some embodiments, topographical distance drawn from watershed method is used to represent such proximity information. As such, the driving forces of the evolving contours come from the combination of a statistical force, which is drawn from the region-based or edge-based active contour model (such as the shape of the individual contours, interior/exterior density of the individual contours, or the local intensity near the individual contours), and a topographical force that relates the boundary to the topographic distance to a region minimum (marker) associated with each object.

When the contours of two objects are far from each other, the evolution of the contours is mainly driven by the local statistical force. Under this condition, the topographical force is turned off. However, when the two evolving contours become close enough, the topographic force is automatically activated. The statistical and topographic forces both contribute strongly under this condition. For example, when two objects with similar intensity values intersect, the statistical difference between them at the intersecting segment becomes weak, making the topographic force play a dominant role. Whereas at the remaining segments of the evolving contours, the statistical force plays a dominant role because of the large distance between the non-intersecting contour segments and the usually stronger statistical difference between the inside of the object and the background intensities. This allows the method to take full advantage of the strong statistical difference between the foreground (object) and background at the contour segments that do not interact with each other.

FIG. 5 illustrates the calculation of topographic force using two objects as an example. The gradient of the original image is computed as a relief function representing edge evidence. Internal and external markers are determined for each contour of the objects, e.g., by eroding the object contour C obtained from the previous image. In FIG. 5, regional minima M1 and M2 are formed by eroding the initial contours of $C_1$ and $C_2$, respectively. The modified relief is achieved by performing a reconstruction by erosion or recursive conditional erosion from the obtained regional minima $M_1$ and $M_2$. The topographical distance L between two voxels x and y is a spatial weighted distance defined by Equation 8, where inf refers to the infimum (i.e., greatest lower bound) of a set.

$$L(x, y) = \inf_{\gamma \in [x \to y]} \int_\gamma |\nabla f(\gamma(s))| ds \quad (8)$$

where [x→y] denotes the set of all possible paths from voxel x to voxel y. In discrete case, the topographical distance between two voxels p and q is a weighted distance defined by Equation 9a.

$$L(p, q) = \min_{\pi \in [p \to q]} \sum_{i=1}^{n} cost(p_{i-1}, p_i) \quad (9a)$$

where the minimization is taken over all possible paths $(p_1=p, p_2, \ldots, p_n=q)$ between two voxels p and q (See Meyer, F. 1994). The cost of walking from voxel p to voxel q is related to the lower slope, which is defined as the maximum slope linking p to any of its neighbors of lower altitude, given by Equation 9b.

$$\begin{cases} LS(p_{i-1}) \cdot dist(p_{i-1}, p_i) & \text{if } f(p_{i-1}) > f(p_i) \\ LS(p_i) \cdot dist(p_{i-1}, p_i) & \text{if } f(p_{i-1}) < f(p_i) \\ \min(LS(p_i), LS(p_{i-1})) \cdot dist(p_{i-1}, p_i) & \text{if } f(p_{i-1}) = f(p_i) \end{cases} \quad (9b)$$

where dist( ) denotes the Chamfer distance, and LS(x) is the lower slope at point x.

For each regional minimum (marker Mi), the corresponding topographic distance transform is defined by Equation 10

$$L_i(x) = L(x, M_i) = \inf_{y \in M_i} L(x, y) \quad (10)$$

By considering watershed segmentation as an energy minimization problem, the motion of the boundary of watershed can be driven by the vector sum of the compressing forces, herein termed as the topographical force. For $C_1$ as depicted in FIG. 5, the topographic force can be based on the difference of topographic distance with respect to $M_1$ and $M_2$, and can be written as $[(\alpha_1-\alpha_2)+(L_1-L_2)]$, where $\alpha_i(i=1, 2)$ is the intensity level on $M_i$, and $L_1$ and $L_2$ are the topographic distance from the region minima $M_1$ and $M_2$, respectively.

The topographic force can further incorporate a weight function h, which can be defined as a function of distance d between the two contours (i.e., the shortest distance between a point on one contour to the other contour). The weight can be written as $w_1=h(\phi_2)$, $w_2=h(\phi_1)$. For example, the weighted topographic force for the evolving curve $C_1$ can be defined as $h(\phi_2)[(\alpha_1-\alpha_2)+(L_1-L_2)]$. The weighting function h can have the following characteristics. As the distance goes into the topographical influence zone ($d<d_{max}$), h is larger and can be nearly constant. In case the distance is outside the topographic influence zone ($d \leq d_{max}$), the function h can be very small and vanish. In this manner, the topographic forces can function as a complement of statistical forces, when the statistical force becomes too weak to drive the contour to the correct boundary.

Figure 6:
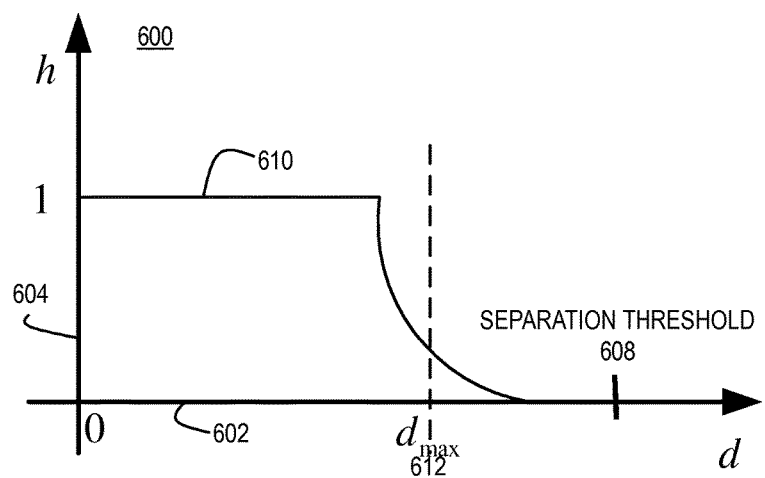
FIG. 6 is a graph that illustrates a separation weighting function for the topographical effects, according to an embodiment.
Figure 7A:
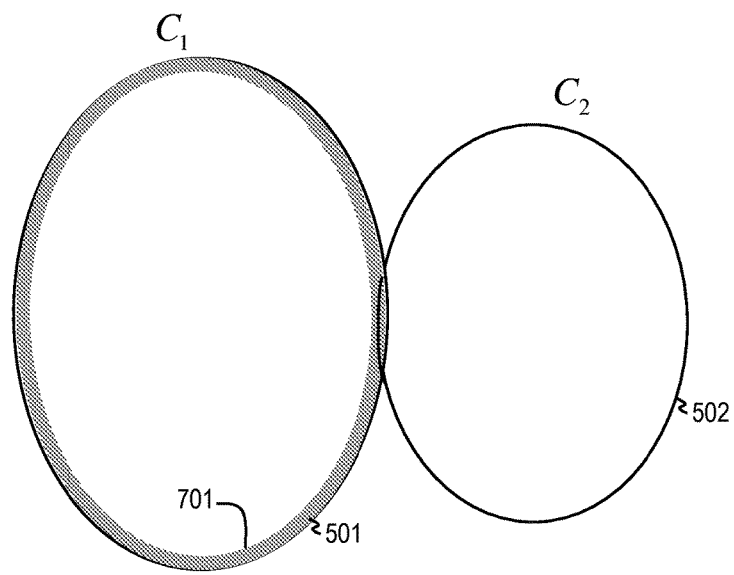
FIG. 7A is a block diagram that illustrates the boundary voxels on a first boundary affected by the local regional statistics, according to an embodiment.
Figure 7B:
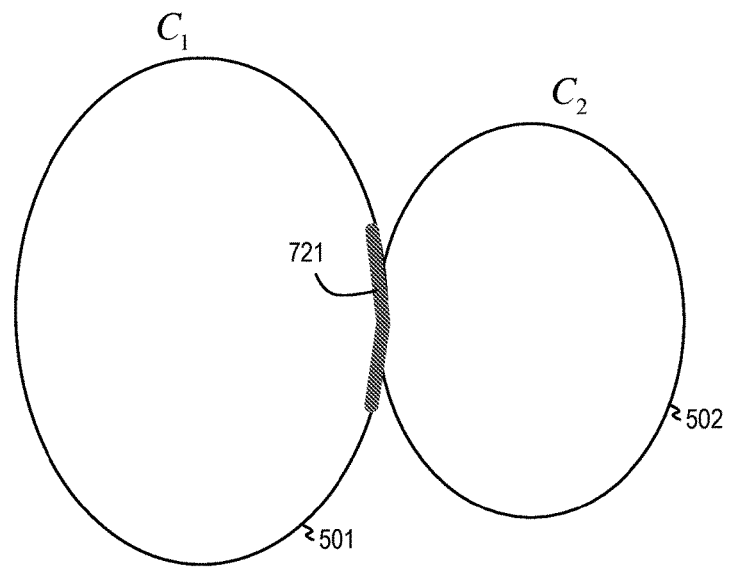
FIG. 7B is a block diagram that illustrates the boundary voxels on a first boundary affected by the topographical effects of a second boundary, according to an embodiment.

FIG. 6 is a graph 600 that illustrates a separation weighting function h for the topographical effects, according to an embodiment. The horizontal axis 602 is distance d, the vertical axis 604 is multiplicative factor. The trace 610 indicates the weighting function h, which falls off substantially in the vicinity of dmax 612 and is zero by a separation threshold distance 608. FIG. 7A is a block diagram that illustrates the boundary voxels 701 on a first boundary C1 501 affected by the local regional statistics, according to an embodiment. FIG. 7B is a block diagram that illustrates the boundary voxels 721 on the first boundary C1 501 affected by the topographical effects of a second boundary C2 502, according to an embodiment. Voxels on C1 father than the separation threshold distance 608 are not affected by the boundary C2 502, and voxels at a distance $d_{max}$ 612 are just barely affected.

Incorporating both the statistical force and the topographical force, and using the localized regional active contour model, the evolution equation for each level set function $\phi_i(i=1 \ldots n)$ of the multiple objects is written as Equation 11.

$$\frac{\partial \phi_i}{\partial t} = \begin{bmatrix} div\left(\frac{\nabla \phi_i}{|\varphi_i|}\right) + \lambda_1 |u_0(x, y) - c_{1x,i}|^2 - \\ \lambda_2 \prod_{j \neq i} H(\phi_j) |u_0(x, y) - c_{2x}|^2 - \\ \gamma \sum_{j \neq i} H(\phi_j) + h(\phi_j)[(\alpha_i - \alpha_j) + (L_i - L_j)] \end{bmatrix} \delta(\phi_i) \quad (11)$$

where $u_0$ is the image data; $\lambda_1$, $\lambda_2 \geq 0$ $\gamma \geq 0$, are preselected parameters (constants); H is the Heaviside function; and $\delta$ is the one-dimensional Dirac measure; $c_{1,x,i}$ and $c_{2x}$ are the localized intensity averages of $u_0$ inside and outside of $C_i$, respectively. The term $$-\gamma \sum_{j \neq i} H(\phi_j)$$

in the bracket is used to remove overlaps between distinct contours: When the contours are overlapping its value is negative, forcing the evolving contour to recede from the current location. In other embodiments, besides or instead of the averages $c_{1x}$, $c_{2x}$, other statistical metrics of the voxel amplitudes in an area inside or outside the boundary are used, such as median, certain percentile, minimum, maximum, variance, standard deviation, skewness, or other parameter or model fits to the distribution of amplitudes are used.

After each slice of the cross sectional image data is processed by the propagation-refinement procedure described above, further overall refinement can be achieved by using the slice-by-slice segmentation result as the initial object surface for a 3D localized regional active contour method. For example, one such 3D active contour method can be based on a 3D Chan-Vese model, where curve C in the 2D Chan-Vese model can be replaced with the area S, and the length (C) of the curve can be replaced with the surface area(S). The inside and outside region can be obtained from a sphere (or any other shape) whose center is located on the surface and the radius is determined by the volume of the object previously determined.

This driving force $(\alpha_i+L_i)-(\alpha_j+L_j)$ is called herein the topographic force, since it is based on the topographic distance, as opposed to the statistics force in the regional active contour models. Thus, a point on the boundary moves as long as it still resides inside one of the catchment basins of one of the markers, where the topographic force is not equal to zero; and, stops when the value equals zero. The weighted topographic force can be also decomposed into two competing component. For the contour $C_1$, the weighted topographic force may be written in terms of advance forces $a_T$ and retreat force $r_T$ according to Equation 12

$$a_T = h(\phi_2)(-\alpha_2-L_2)$$

$$r_T = h(\phi_2)(\alpha_1+L_1) \quad (12)$$

They can be integrated into other terms that affect advance and retreat and thus the multiple contours compete with each other In a way that includes a topographical force. Extension to higher dimension is straightforward, since the level-set function and topographic distance have the same formulation in higher dimension.

In the illustrated embodiment, in step 313, the separation distance threshold is determined, as well as the form of the weighting function h(d) so that the multiplicative factor is a small fraction of one at a distance $d_{max}$. In some embodiments, the size of dmax is based on the size of the target object. For large size target objects, such as the liver, a separation distance threshold is selected in a range from about 2 voxels to about 16 voxels; while, for a small target objects, such as a lymph node, a separation distance threshold is selected in a range from about 2 voxels to about 5 voxels.

In step 315, the inside marker, e.g. the regional minimum, is determined for each boundary. This can be achieved by eroding the initial contour, which can be formed manually in the first start frame or propagated from the previous frame. In FIG. 5, regional minimum $M_1$, 521 and $M_2$ 522 are formed by eroding the initial contours C1 501 and C2 502 with a properly defined radius. Alternatively, the regional minimum can be formed by first finding a centroid of the initial contour, then expanding it for a few voxels. The only requirement is that the obtained regional minima are located totally inside the corresponding objects. Apparently, this is not a strong constraint, as long as the initial contour is roughly surrounding the object of interest. For the object of interest defined by contour $C_1$ 501, $M_1$, 521 and $M_2$ 522 can be considered as its internal and external marker respectively. Similarly, for the object of interest defined by contour $C_2$ 502, $M_2$ 522 and $M_1$, 521 can be regarded as its internal and external marker respectively. In some embodiments, each of the multiple boundaries is defined by a different level set value.

In step 317, the topographic distance field is determined for each marker. That is the topographic distance is determined from each point near one of the boundaries to each marker internal to one of the boundaries. In some embodiments the voxels within a regional minimum are excluded from the computation of topographical distance, since by definition such voxels must belong within the boundary of the corresponding object. One embodiment of this process is described in more detail below with reference to FIG. 4.

In step 319, the separation distance is determined for the next point on one boundary to the nearest point on each of the other boundaries. For boundaries defined by a signed distance function (SDF) as the level set function, the value of a voxel on that function describes the shortest distance to that boundary by definition and the boundary is defined by voxels where the level set function has the value zero.

In step 321, it is determined whether the separation distance for that point is greater than the separation threshold. If so, control passes to step 341. In step 341 the boundaries move based on evolution equation that does not include a topographical term. For example, the boundaries moved based on the evolution equation for the local regional energy functional. Control then passes to step 351. In step 351 it is determined whether the current iteration is the last iteration. For example, it is determined whether every point in each boundary has been subjected to the evolution equation. If it is determined that this is not the end of the iteration, then control returns to step 319 to revisit another point in each boundary. If it is determined that the iteration is completed, then control passes to step 361 to determine if an end condition is satisfied, as described above.

If it is determined in step 321, that the separation distance of the current point is not greater than separation threshold then control passes to step 231 to include topographical term in the evolution equation. In the illustrated embodiment, step 331 includes steps 333 and 335. In step 233 topographical term is included in the evolution equation. The topographical term includes topographical distance cost of each boundary point from markers of two or more boundaries. For the example contour $C_1$, the topographic force, the topographic distance difference from regional minimum $M_1$ and $M_2$, can be written as: $[(\alpha_1+L_1)-(\alpha_2+L_2)]$. In step 335 the separation distance weighted topographical term is included in the evolution equation. The weighted topographic force for the example evolving curve $C_1$ can be written as: $h(\phi_2)[(\alpha_1-\alpha_2)+(L_1-L_2)]$. In the same way, the weighted topographic force for the example evolving curve $C_2$ can be written as: $h(\phi_1)[(\alpha_2+L_2)-(\alpha_1+L_1)]$. Then control passes to step 341 to move the boundary based on the evolution equation, as described above.

One of the unique properties of the method described here is that both the statistics force and topographic force can function at different portion of the evolving contour simultaneously in the seamless fashion. This is distinguished from other methods in the literature, which are just trying to combine watershed transform and active contour models in two separate steps.

In various embodiments, the topographical force term is used in an evolution equation with any other term related to boundary detection known in the art. Known terms related to boundary detection are used in various active contour models known in the art, from which one or more terms may be taken, include, among others: edge-based active contour model terms such as a snake mode and a geodesic active contour model; and region-based active contour models such as active contours without edges, mean separation energy, histogram separation energy, graph partition active contour, and local histogram based segmentation using the Wasserstein distance.

4. COMPUTING FIELDS OF TOPOGRAPHICAL DISTANCE

Figure 4A:
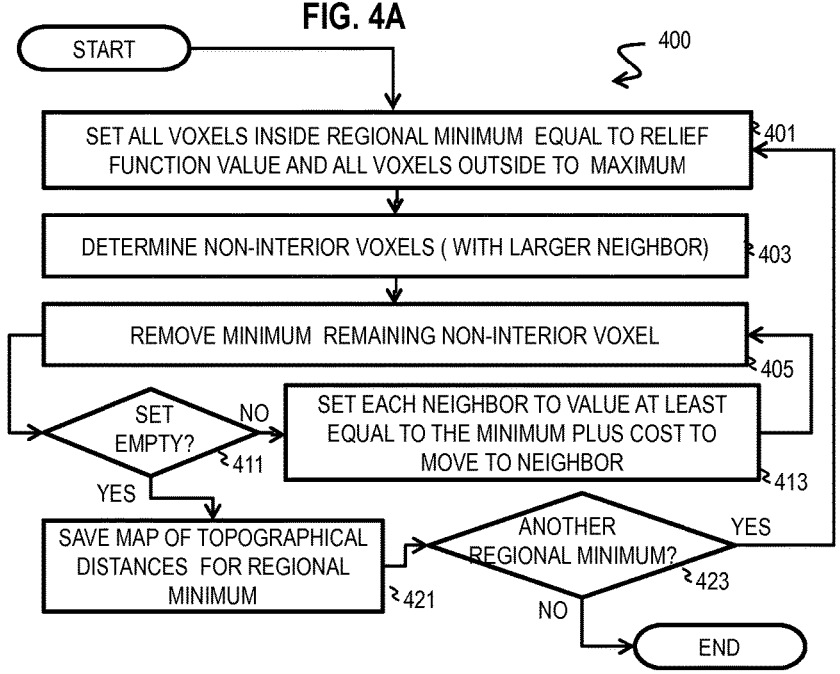
FIG. 4A and FIG. 4B are flow charts that illustrate alternative methods for performing a step of the method of FIG. 3 to compute topographical distance, according to various embodiments.
Figure 4B:
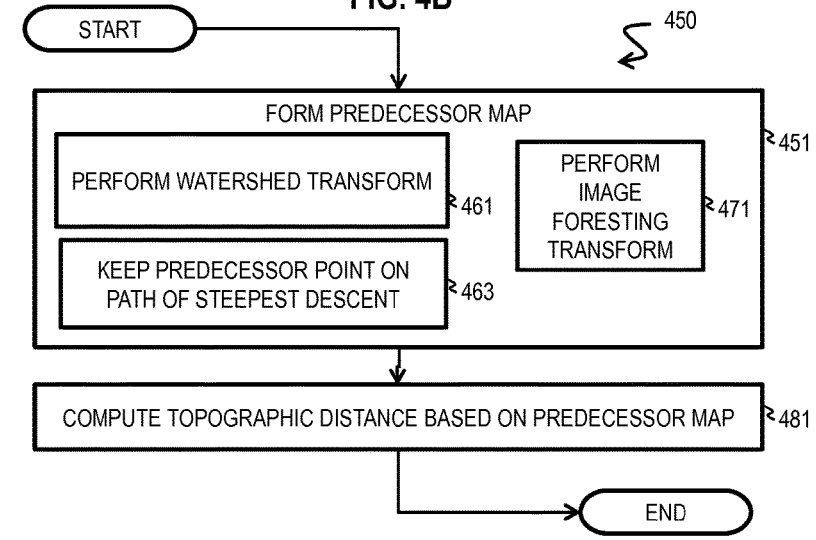

In some embodiments, the topographical distance is computed using one or more of the following techniques. For the 1D case, the topographical distance function computation is straightforward since there is only one possible path between any two points. For the 2D or higher dimension cases, the computation is much more complicated. For some embodiments, one of two novel approaches is used for computing the topographical distance. FIG. 4A and FIG. 4B are flow charts that illustrate alternative methods for performing a step of the method of FIG. 3 to compute topographical distance, according to various embodiments.

FIG. 4A is a flow chart for a first approach 400. By definition, the topographic distance is the integration of the current cost and total cost of the optimal subpath. Therefore, a modification of Moore's algorithm, originally designed for computing the shortest path from a node to all others, is used to compute the topographic distance for a relief function $f$ for which we know the set of regional minima $m_i$.

Let G represent all the nodes of the grid and U the neighborhood relations and $\pi(x)$ the topographical distance for voxel x, and the relief function $f$ represent the morphological gradient of the image data. In a first approach used in some embodiments, the topographic distance of each voxel from a regional minimum is computed in the following way.

In step 401, initialization is performed. For all voxels of the regional minimum, the minimal distance is known and is equal to the value of the relief function $f$ at that voxel of the regional minimum: $\forall x \in m_i, \pi(x)=f(x)$. For all other voxels z, set $\pi(z)=\infty$ (where $\infty$ indicates a value at or near the largest value of the computing device).

In step 403, the interior voxels of the regional minima, i.e., the voxels without a higher neighbor are put into the set S; all other voxels including the voxels of the inner boundary $\partial m_i$ of the regional minima are put in the set $\overline{S}$ of non-interior voxels.

In step 405, a minimum voxel in $\overline{S}$, i.e., voxel $x \in \overline{S}$ for which $\pi(x)=\min_{z \in \overline{S}} \pi(z)$, is determined and removed from the set $\overline{S}$ of non-interior voxels.

In step 411, it is determined whether the remaining set $\overline{S}$ is empty. If so, the determination of topographical distance from the first regional minimum is completed for every voxel in the ROI. If not, control passes to step 413.

In step 413, for each voxel neighbor z of the minimum voxel x inside the set $\overline{S}$, set the value of $\pi(z)$ as follows:

if $\pi(z) < \pi(x)+\text{cost}(x,z)$ then $\pi(z)=\pi(x)+\text{cost}(x,z)$ where cost(x,z) is given by Equation 9b. Otherwise, leave $\pi(z)$ unchanged. The cost of walking from pixel p to pixel q is related to the lower slope, which is defined as the maximum slope in the relief function $f$ linking p to any of its neighbors of lower value of the relief function $f$. Control passes back to step 405, described above.

If it is determined in step 411 that the determination of topographical distance is completed for one regional minimum (e.g., marker M1), then in step 421 the values for the regional minimum at all voxels in the ROI are saved, e.g., stored on a computer-readable medium. If there is another regional minimum not yet processed, then the process above should be repeated for the next regional minimum, until topographical distances to all regional minima have been mapped and saved. Thus, in step 423, it is determined whether there is another regional minimum to process. If not, the process ends. If so, then control passes back to step 401 and following steps to repeat the process for the next regional minimum (e.g., marker M2). One map of topographical distance is determined for every regional minimum.

The process 400 is similar to one described in Meyer 1994, except that the label does not need to be propagated. Using the hierarchical queue or FIFO (First in first out) priority queue data structure, the topographic distance based on the Moore algorithm can be computed efficiently. After computing the topographical distance of each voxel to one regional minimum (e.g., marker M1), the above steps are repeated for a second regional marker to compute topographical distance of each voxel to the second regional minimum (e.g., marker M2).

FIG. 4B is a flow chart for a second approach 450. The second approach is based on two important properties of topographic distance for a relief function $f$ with lower completion, that is, each voxel which is not in a minimum has a neighbor of lower grey value. (a) If two voxels p and q belong to a line of steepest slope between p and q, $f(q)>f(p)$, then $L(p,q)=f(q)-f(p)$; (b) The function $f$ can be fully reconstructed from the topographic distance to the associated regional minimum as follows:

$$f(x) = \min_{1 \le j \le K} \{\alpha_j + L_j(x)\}.$$

In other words, the topographic distance $\alpha_i + L_i(x)$ equals $f(x)$ within the catchment basin $CB_i$.

Thus the Equation 13 holds:

$$\alpha_i + L_i(x) = \begin{cases} f(x), & \text{if } x \in CB_i \\ f(w_x) + |f(x)-f(w_x)|, & \text{if } x \notin CB_i \end{cases} \quad (13)$$

Here voxel $W_x$ satisfies two conditions: (a) it is on the watershed line separating the catchment basins of at least two minima Mi; (b) it is an upstream voxel of x. A voxel q is upstream of a voxel p, if there exists a path of steepest slope between p and q.

The catchment basins $CB_i$ and the watershed line can be easily obtained from the standard watershed transform. Then the problem is how to find the position of voxel $w_x$ for each voxel x. The standard watershed transform was modified by recording the predecessor position in the optimum path for each voxel in the propagation procedure. The predecessor voxel for each voxel x on the optimum path is indicated at voxel x to form a predecessor map. In this way, the upstream path from the point x upward to the watershed line can be obtained and the position of $w_x$ can be determined for each voxel x. It is noted that the image foresting transform of Falco, 2004, is utilized in addition to or instead of the watershed transform, in some embodiments, to produce predecessor map.

Thus, in step 451 a predecessor map is formed. In some embodiments, step 451 includes step 461 to perform the watershed transform and step 463 to record at each voxel the predecessor voxel on the optimal path (e.g., the path of steepest descent) determined during the watershed transform. In some embodiments, step 451 includes step 471 to perform image foresting transform to produce the predecessor map.

In either embodiment, the predecessor map is employed to compute topographic distance in step 481. For each voxel x, the associated $f(x)$, $w_x$ and equation 13 are used to compute the topographic distance functions to the corresponding regional minima (e.g., markers).

Both approaches are computationally efficient. The first one computes only one topographic distance function from one regional minimum. To compute multiple topographic distance functions, the first approach is run iteratively. The second approach can compute multiple topographic distance functions from corresponding multiple regional minima in a single iteration. It should be noted that the topographical distance to each regional minimum needs to be computed only once after all the regional minima are specified.

When propagating a contour using the local or global region-based active contour model, if the object boundaries change drastically from one slice to the next, undesireable results can occur. The local statistic difference between inside and outside of the local region can become very weak, trapping the evolving contour in a local minima, which might not be the desired object boundary. This can occur when segmenting a relatively large organ (e.g., liver or spleen), or when the slice thickness is large. Thus, when the local statistical difference between a specified narrow band around the evolving contour becomes very weak, and when the statistical difference between the average amplitude inside the local region and the average amplitude inside the entire contour is very small it is useful to include an expanding force ε, e.g., ε∈(0,1] to the evolution equation presented above as Equation 4. Therefore, in some embodiments the evolution equation is defined as given by Equation 14.

$$\frac{\partial \phi}{\partial t} = \delta(\phi)\left[\mu div\left(\frac{\nabla \phi}{|\phi|}\right) - v - \lambda_1|u_0(x, y) - c_1|^2 + \lambda_2|u_0(x, y) - c_2|^2 + \varepsilon\right] \quad (14)$$

Where $c_1$ and $c_2$ represent either the global means or local means, the latter defined in Equation 6 and Equation 7.

The steps to implement this version of the evolution equation include: 1) calculate the average amplitude m inside the contour C; 2) define a local region for the expanding force for which the center is on the boundary and the radius is specified by a $r_2$, which need not be the same as the radius r of the local region-based term; 3) calculate the means $m_1$ and $m_2$ for the parts of the local region for the expanding force that are inside and outside the boundary, respectively; 4) include the expanding term as given by Equation 15.

$$\varepsilon = 1 \text{ if } |m_1 - m_2| < b_1 \text{ AND } |m_1 - m| < b_2 \quad (15)$$
$$= 0, \text{ otherwise}$$

Where $b_1$ and $b_2$ are prespecifice parameters with positive values.

4. EXAMPLE EMBODIMENTS

In one embodiment, the tissue detection segmentation process includes the following steps.
1) Use n distinct level set functions to represent n objects of interest in a reference image (a pre-determined image) as an initialization.
2) Update average intensities inside and outside the evolving contours or surface using (6) and (7).
3) Compute weighted topographic force.
4) Evolve each level set function according to (11).
5) Determine stop condition, if satisfied then stop, otherwise go to step 6).
6) Propagating to the next frame, and go to step 2).

When n (n>1) objects of interest are spatially disconnected on the image, segmentation of all of the objects is achieved, in this embodiment, by using a single level set function φ to represent the evolving contour that can be initialized by manually drawing a closed curve roughly enclosing all of the objects. Region based active contour, like active contour model without edges are used to guide the evolution of the curve. When m (1<m<=n) out of the n objects of interest are spatially connected on the image, in addition to a manually-determined (closed) curve enclosing all of the n objects (this is desirable only when m<n), manual initialization for each of the connected objects is advantageous and achieved by drawing an initial (closed) curve near the object boundary.

Two Similar Objects.

Figure 9A:
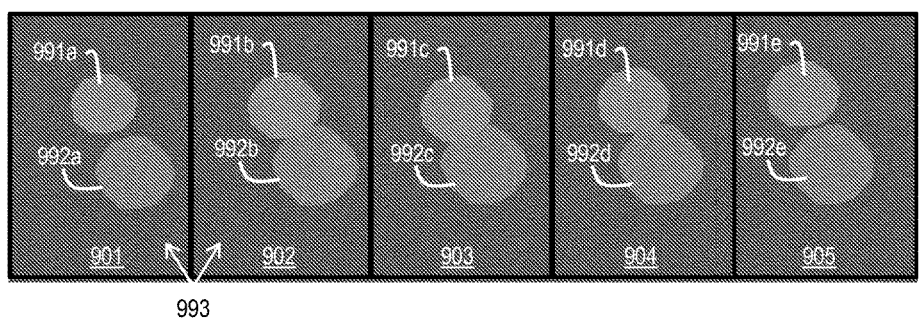
FIG. 9A is a block diagram that illustrates five example frames of simulated image data in which two objects represented in noisy image data, which are separate in at least one frame, maintain a boundary after contacting each other, according to an embodiment.

FIG. 9A is a block diagram that illustrates five example subsets of simulated image data in which two objects represented in noisy image data, which are separate in at least one frame, maintain a boundary after contacting each other, according to an embodiment. The five subsets may be five successive or unordered, adjacent or non-adjacent, slices of axially displaced cross sectional images, or five successive or unordered, temporally displaced frames of the same scene, e.g., from a cytometry fluorescence or microscope measurement. The five subsets of image data are labeled 901, 902, 903, 904 and 904, respectively. Apparent in each subset of image data is a background 993 of one relatively dark intensity. Also evident is a first object represented by voxels 991a, 991b, 991c, 991d and 991d of relatively light intensity in the five subsets, respectively. Also included is a second object represented by voxels 992a, 992b, 992c, 992d and 992d of slightly less light intensity compared to the first object in the five subsets, respectively. The intensity for the upper (first) object, lower (second) object and the background are 100, 90 and 50, respectively.

This simulated image data presents a challenge for many segmenting approaches. The simulated image data includes multiple objects well distinguished from the background, but not so well distinguished from each other. The challenge is where to draw the boundary between the two objects when the objects come into contact with each other. Note the area of the first object in the first subset is smaller than in the other subsets, which makes an area conservation assumption, used in some approaches, invalid. According to an experimental embodiment, a boundary is drawn that is superior to the boundaries produced by previous methods.

In one experiment, a global regional active contour method (Chan et al., 2001) is used to segment the two objects in the first slice with parameter setting μ=0.6, v=0, $\lambda_1 = \lambda_2 = 0.3$ in Equation 4. The resulting segmentation boundary is used as the initial contours for refining and propagating the boundary using the various embodiments. Refining the boundary using the same global regional active contour model above produces a single boundary between both objects and the background; and no boundary between the objects when they abut. It is clear that the model cannot distinguish the two distinct objects, leading to blatantly erroneous segmentation.

A coupled global regional active contour with intersection constraint from the prior art is then used. Although the model maintains contours of touching objects disjoint, the contours are unable to accurately trace the interface between the two objects.

The boundary refining results were then obtained for noise-free images using the coupled local region-based active contour method with radius r=8 voxels. As the initialization contours are near the object boundaries, the segmentation result has improved in comparison with the global regional one. However, in some place near the interface boundary, the model is unable to drive the evolving contour to the true interface boundary. This becomes more prominent for refining the boundary in noisy image data, as show in FIG. 9B and FIG. 9C for the first object and second object, respectively.

Figure 9B:
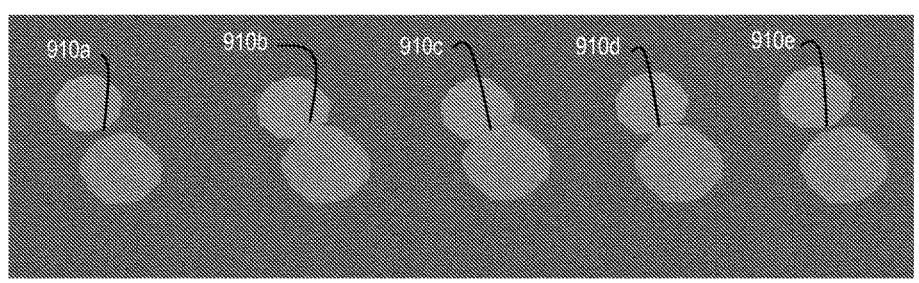
FIG. 9B is a block diagram that illustrates example boundaries for the five example frames of FIG. 9A based on a local regional statistic of the upper object boundary initialized in the first frame, according to an embodiment.

FIG. 9B is a block diagram that illustrates example boundaries for the five example frames of FIG. 9A based on a local regional statistic of the upper object boundary initialized in the first frame, according to an embodiment. To avoid obscuring the aspects to be illustrated, the bounds of the five subsets re not drawn in FIG. 9B through FIG. 9E. The position of the boundary of the first object is illustrated in the five subsets by boundary lines 910a, 910b, 910c, 910d and 910e, respectively. As can be seen, the local region-based active contour method provides good results where the first object abuts the background but does a poor job where the first and second objects abut (see especially, the boundary lines 910b, 910c and 910d where the first and second objects abut. The boundary does not follow the actual change from light to less light voxels.

Figure 9C:
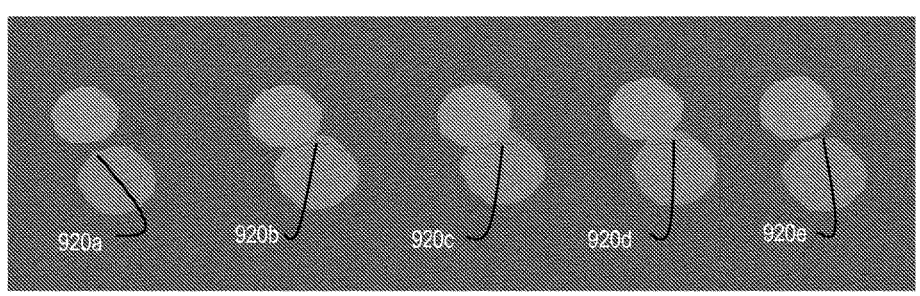
FIG. 9C is a block diagram that illustrates example boundaries for the five example frames of FIG. 9A based on a local regional statistic of the lower object boundary initialized in the first frame, according to an embodiment.

A similar result is obtained for the boundary of the second object depicted in FIG. 9C. FIG. 9C is a block diagram that illustrates example boundaries for the five example frames of FIG. 9A based on a local regional statistic of the lower object boundary initialized in the first frame, according to an embodiment.

The boundary refining result using the proposed model (Equation 11, described above) for noise-free and noisy images respectively. The parameter setting are as the same as in the coupled local region-based active contour method. In the computation, to calculate topographic force, the relief image was computed from the morphological gradient of the original image. Then it was transformed into a lower complete image. The results indicated the introduced topographic force significantly improve the segmentation, especially for noisy image, as shown in FIG. 9D and FIG. 9E.

Figure 9D:
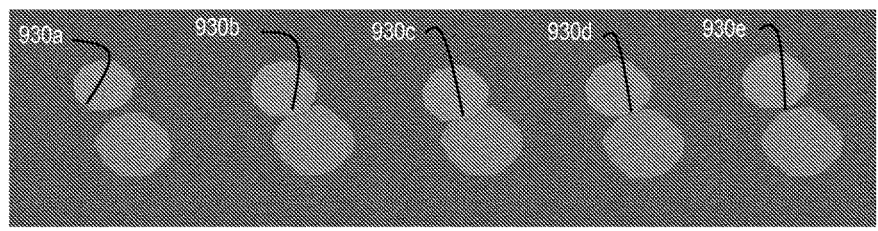
FIG. 9D is a block diagram that illustrates example boundaries for the five example frames of FIG. 9A based on a local regional statistic and topographic effects for the upper object boundary initialized in the first frame, according to an embodiment.

FIG. 9D is a block diagram that illustrates example boundaries for the five example frames of FIG. 9A based on a local regional statistic and topographic effects for the upper object boundary initialized in the first frame, according to an embodiment. As can be seen, the local region-based active contour method provides good results not only where the first object abuts the background but also where the first and second objects abut (see especially, the boundary lines 930b, 930c and 930d where the first and second objects abut. The boundary does follow the actual change from less light to more light voxels.

Figure 9E:
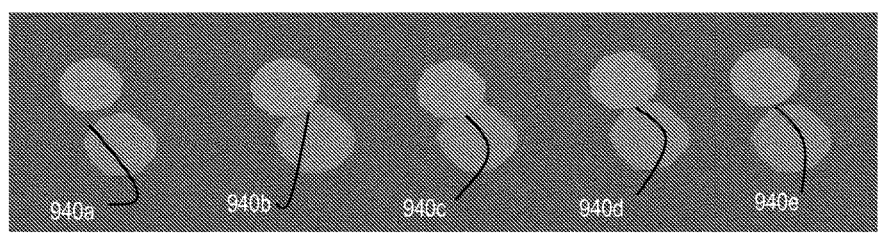
FIG. 9E is a block diagram that illustrates example boundaries for the five example frames of FIG. 9A based on a local regional statistic and topographic effects for the lower object boundary initialized in the first frame, according to an embodiment.

FIG. 9E is a block diagram that illustrates example boundaries for the five example frames of FIG. 9A based on a local regional statistic and topographic effects for the lower object boundary initialized in the first frame, according to an embodiment. Similar favorable results are obtained for boundaries 940c, 940c and 940d.

Further experiments were performed using coupled global region-based active contour method with intersection and area conservative constraint in the same spirit of volume conservation constraint for 3D objects. Interestingly, the upper object at the last slice is not perfectly segmented due to its area in the first slice is smaller that the rest. Part of the upper object was incorrectly segmented as the lower object. This observation indicates that area conservation constraint is not robust for separating abutting objects which have noticeable variations in size.

Three Similar Objects.

Figure 10A:
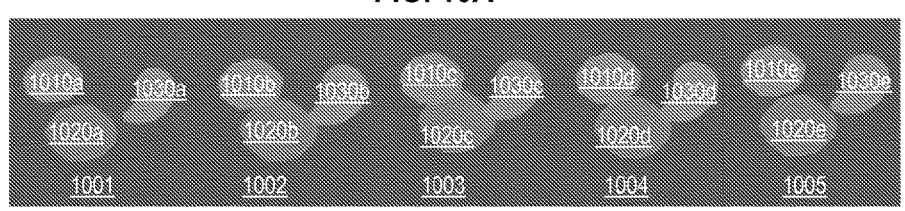
FIG. 10A is a block diagram that illustrates five example frames of simulated image data in which three objects represented in noisy image data, which are separate in at least one frame, maintain a boundary after contacting one or more of each other, according to an embodiment.

Experiments were also performed for three objects with intersections. Another irregular object was added to the image sequence of FIG. 9A to produce the image sequence of FIG. 10 A. FIG. 10A is a block diagram that illustrates five example frames of simulated image data in which three objects represented in noisy image data, which are separate in at least one frame, maintain a boundary after contacting one or more of each other, according to an embodiment. The intensities for the upper left (first) object, upper right (third) object, lower (second) object, and the background are 100, 100, 90, and 50 respectively.

Figure 10B:
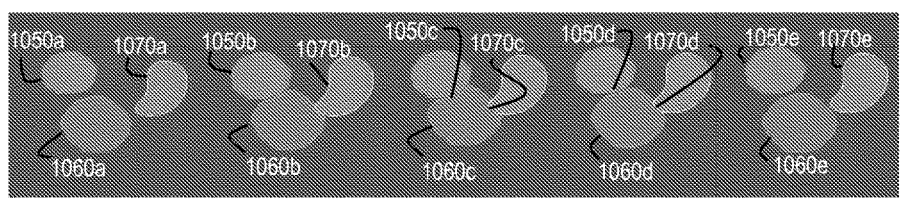
FIG. 10B is a block diagram that illustrates example boundaries for the five example frames of FIG. 10A based on a local regional statistic and topographic effects for three boundaries initialized in the first frame, according to an embodiment.

FIG. 10B is a block diagram that illustrates example boundaries for the five example frames of FIG. 10A based on a local regional statistic and topographic effects, for three boundaries initialized in the first frame, according to an embodiment. The dynamic topographic force helps to drive the evolving contour to the object interface, even if the shape of the object is irregular. The assumption that the interface can be approximated by a straight line as made in some prior art approaches clearly does not hold in the simulation.

Ring-Shaped Objects.

When the objects of interest have inner boundaries, some embodiments automatically detect rough initial boundaries without manual delineation of the second, inner contour. In this way, a single initial boundary enables automatic detection of both the outer and the inner boundary. This embodiment offers the advantage of reducing manual intervention for inner boundary delineation. The illustrated embodiments incorporate one or both of two methods for automatic determination of the inner boundary. In an example embodiment, one or both methods are included in class specific operations depicted in step 253 in FIG. 2, such as during step 257 to determine the inner boundary for a brain tumor. In some embodiments, a pre-classification is done, e.g., as non-viable brain tissue, during step 203.

The first method is based on the statistical analysis of the image intensity enclosed by the outer boundary. In a first step of the first method, a two Gaussian mixture model is fit the image intensity inside the outer boundary. The percentage of the components $p_i$ and average amplitude value $m_i$ and standard deviation $\sigma_i$, are obtained, where $i \in \{1, 2\}$. Suppose that $m_1 < m_2$, and the percentage of each of the two Gaussian components exceeds a threshold $T_{nv}$, where $T_{nv}$ is in a range from about 0.1 to about 0.5, then the boundary is considered to include non-viable tissue, such as in a brain tumor. Alternatively, or in combination, if the average intensity value of one component is less than a fraction $\alpha$ of the other, with $\alpha$ in a range from about ⅓ to about ⅔ for brain tumors, then the boundary is considered to include non-viable tissue.

If non-viable tissue is found, then an initial position of the inner boundary is determined by the voxels with amplitude values that are below a threshold $T_{inner}$ based on the mean and standard deviation of one or both of the Gaussian components. For example, with brain tissue, the threshold $T_{inner} = m_1 + \beta_{inner} \sigma_1$, where $\beta_{inner}$ is a positive constant selected in a range from about 0.1 to about 2.0, depending on the application. The initial inner boundary is then refined by a morphological operation, such as morphological open to get rid of some noise or morphological erode, to situate the inner boundary inside the non-viable tissue. Once the initial inner boundary is obtained, the local region-based active contour method described above is used to refine the contour.

Figure 11A:
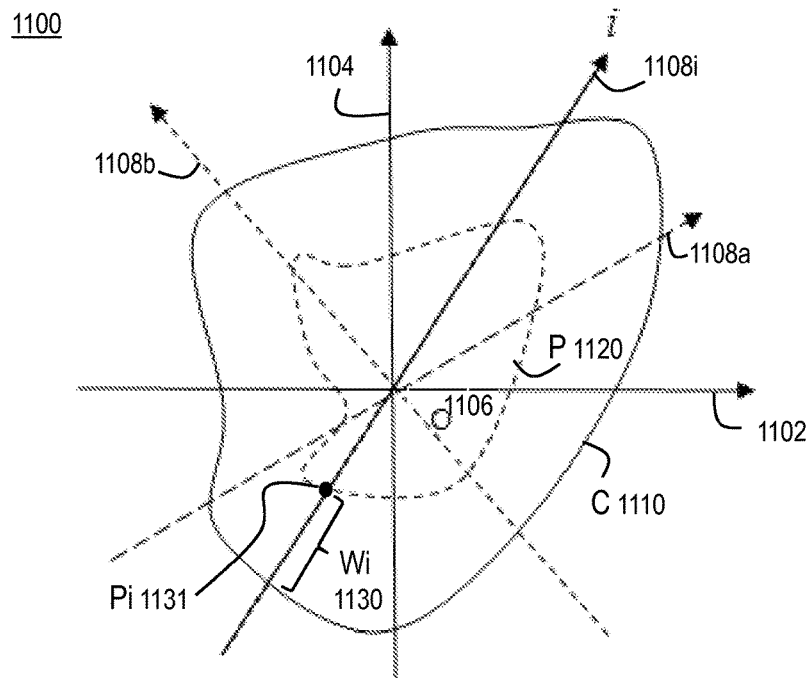
FIG. 11A is a graph that illustrates an example contour map with an inner contour suitable for a brain tumor segmentation, according to an embodiment.
Figure 11B:
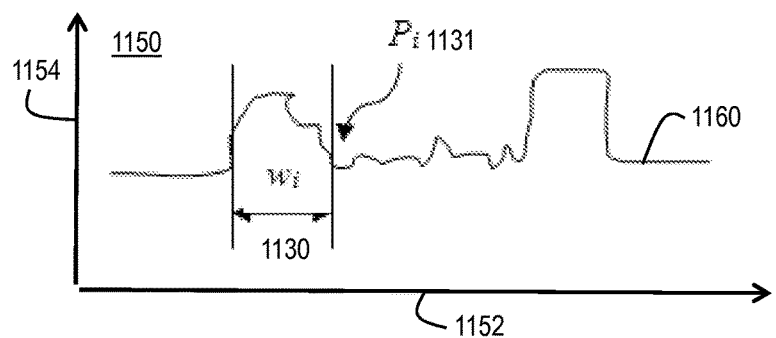
FIG. 11B is a graph that illustrates an example intensity profile through the map of FIG. 11A, according to an embodiment.

The second method is based on analysis of an image profile along a straight line which cross the center of the outside boundary. FIG. 11A is a graph that illustrates an example contour map with an inner contour suitable for a brain tumor segmentation, according to an embodiment. The horizontal axis 1102 indicates voxel location in one dimension, and the vertical axis 1104 indicates voxel location in a perpendicular dimension. The initial outer boundary is given by curve C 1110. The center of the outside boundary C 1110 is given by voxel O 1106. Multiple lines through voxel O 1106 include line 1108a, 1108b and 1108i. FIG. 11B is a graph that illustrates an example intensity profile through the map of FIG. 11A along line 1108i, according to an embodiment. The horizontal axis 1152 indicates to assess along the line from outside to entering the object indicated by the outer boundary to exiting the outer boundary at the opposite side. The vertical axis 1154 indicates intensity of a voxel at that location. The trace 1160 indicates the intensity at the foxholes along the line 1108i. A section of width Wi 1130 of trace 1160 indicates a high-intensity portion of the trace the leading edge of which constitutes the outer boundary and the inner edge of which determines an initial position Pi 1131 of the inner boundary. The position of Wi 1130 and Pi 1131 are depicted in FIG. 11 A. Performing a similar analysis on other lines, such as 1108*a* and 1108*b*, provides of the voxels along the inner boundary which are connected to form a polygon that represents an initial position of the inner boundary.

Thus the second method consists of the following steps. Determine the center O of the outside boundary in the reference image. Create multiple (N) straight lines which pass through the center O. Find the intensity profile along the line $i \in [1, \ldots, N]$. If there is a ring pattern, then determine the width Wi of the ring, and obtain the inner boundary point Pi. Connect all the inner boundary points to obtain a polygon. Use the polygon as an initial inner boundary. Once the initial inner boundary is found, the present invention provides two different strategies for refining and propagating the boundary.

A first strategy uses one mask obtained from the above outer and inner boundary of the object in the reference image. It can be considered as a subtraction of a small mask formed by enclosing the inner boundary from a large mask, formed by enclosing the outer boundary. Therefore this mask has holes. The local region-based active contour method handles holes with the implementation of level set method. The strategy then operates on the amplitudes in the mask area using one of the segmentation procedure described above.

Figure 12A:
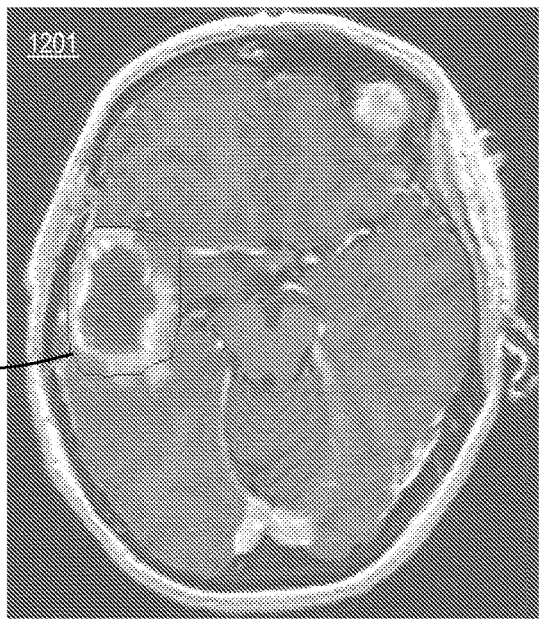
FIG. 12A is an image that illustrates an example initial boundary for a brain tumor in one slice of a magnetic resonance (MR) scan, according to an embodiment.
Figure 12B:
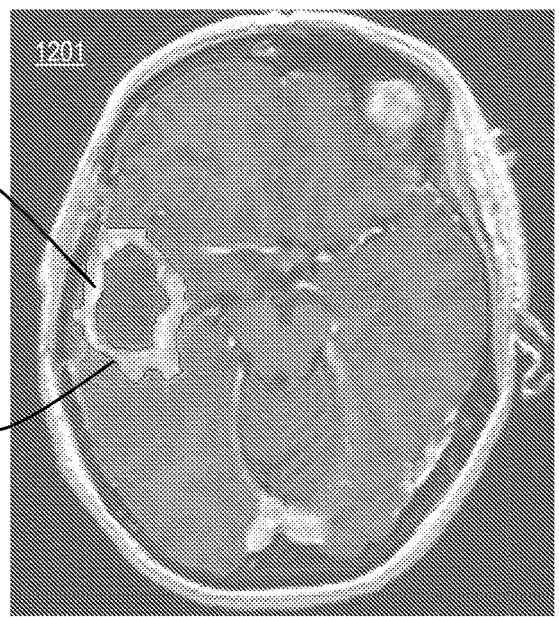
FIG. 12B is an image that illustrates an example refined double boundary for a brain tumor in one slice of a MR scan, according to an embodiment.

A second strategy uses two masks obtained from the above outer and inner boundary separately to define the area of amplitudes to be segmented using one of the procedure described above, e.g., local region-based active contour method. Supposed the segmentation result for the outside boundary as an initialization is $S_{out}$ and the segmentation result for the inner boundary as an initialization is $S_{in}$. The final result is (Sout−Sin), which means a subtraction $S_{in}$ from $S_{out}$ FIG. 12A is an image that illustrates an example initial boundary 1210 for a brain tumor in one slice 1201 of a MR scan, according to an embodiment. FIG. 12B is an image that illustrates an example refined double boundary 1220 and 1230 for a brain tumor in one slice 1210 of a MR scan, according to an embodiment.

5. HARDWARE OVERVIEW

Figure 13:
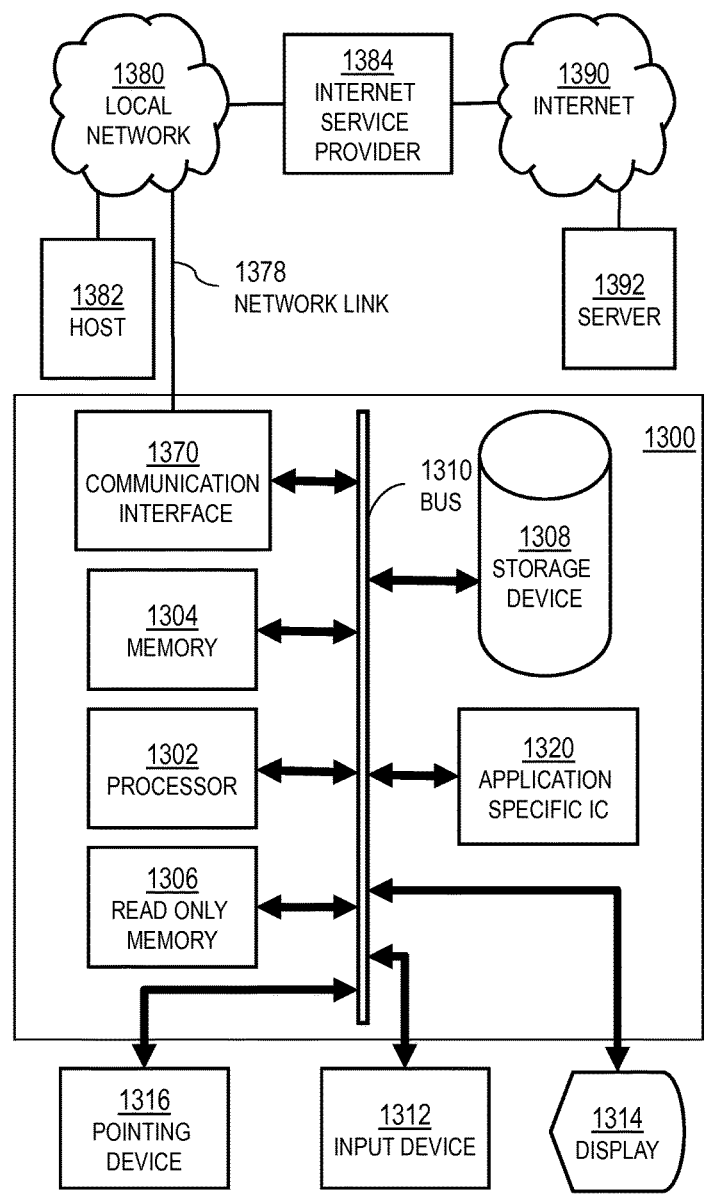
FIG. 13 is a block diagram that illustrates a computer system upon which an embodiment of the invention may be implemented.

FIG. 13 is a block diagram that illustrates a computer system 1300 upon which an embodiment of the invention may be implemented. Computer system 1300 includes a communication mechanism such as a bus 1310 for passing information between other internal and external components of the computer system 1300. Information is represented as physical signals of a measurable phenomenon, typically electric voltages, but including, in other embodiments, such phenomena as magnetic, electromagnetic, pressure, chemical, molecular atomic and quantum interactions. For example, north and south magnetic fields, or a zero and non-zero electric voltage, represent two states (0, 1) of a binary digit (bit).). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 1300, or a portion thereof, constitutes a means for performing one or more steps of one or more methods described herein.

A sequence of binary digits constitutes digital data that is used to represent a number or code for a character. A bus 1310 includes many parallel conductors of information so that information is transferred quickly among devices coupled to the bus 1310. One or more processors 1302 for processing information are coupled with the bus 1310. A processor 1302 performs a set of operations on information. The set of operations include bringing information in from the bus 1310 and placing information on the bus 1310. The set of operations also typically include comparing two or more units of information, shifting positions of units of information, and combining two or more units of information, such as by addition or multiplication. A sequence of operations to be executed by the processor 1302 constitute computer instructions.

Computer system 1300 also includes a memory 1304 coupled to bus 1310. The memory 1304, such as a random access memory (RAM) or other dynamic storage device, stores information including computer instructions. Dynamic memory allows information stored therein to be changed by the computer system 1300. RAM allows a unit of information stored at a location called a memory address to be stored and retrieved independently of information at neighboring addresses. The memory 1304 is also used by the processor 1302 to store temporary values during execution of computer instructions. The computer system 1300 also includes a read only memory (ROM) 1306 or other static storage device coupled to the bus 1310 for storing static information, including instructions, that is not changed by the computer system 1300. Also coupled to bus 1310 is a non-volatile (persistent) storage device 1308, such as a magnetic disk or optical disk, for storing information, including instructions, that persists even when the computer system 1300 is turned off or otherwise loses power.

Information, including instructions, is provided to the bus 1310 for use by the processor from an external input device 1312, such as a keyboard containing alphanumeric keys operated by a human user, or a sensor. A sensor detects conditions in its vicinity and transforms those detections into signals compatible with the signals used to represent information in computer system 1300. Other external devices coupled to bus 1310, used primarily for interacting with humans, include a display device 1314, such as a cathode ray tube (CRT) or a liquid crystal display (LCD), for presenting images, and a pointing device 1316, such as a mouse or a trackball or cursor direction keys, for controlling a position of a small cursor image presented on the display 1314 and issuing commands associated with graphical elements presented on the display 1314.

In the illustrated embodiment, special purpose hardware, such as an application specific integrated circuit (IC) 1320, is coupled to bus 1310. The special purpose hardware is configured to perform operations not performed by processor 1302 quickly enough for special purposes. Examples of application specific ICs include graphics accelerator cards for generating images for display 1314, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1300 also includes one or more instances of a communications interface 1370 coupled to bus 1310. Communication interface 1370 provides a two-way communication coupling to a variety of external devices that operate with their own processors, such as printers, scanners and external disks. In general the coupling is with a network link 1378 that is connected to a local network 1380 to which a variety of external devices with their own processors are connected. For example, communication interface 1370 may be a parallel port or a serial port or a universal serial bus (USB) port on a personal computer. In some embodiments, communications interface 1370 is an integrated services digital network (ISDN) card or a digital subscriber line (DSL) card or a telephone modem that provides an information communication connection to a corresponding type of telephone line. In some embodiments, a communication interface 1370 is a cable modem that converts signals on bus 1310 into signals for a communication connection over a coaxial cable or into optical signals for a communication connection over a fiber optic cable. As another example, communications interface 1370 may be a local area network (LAN) card to provide a data communication connection to a compatible LAN, such as Ethernet. Wireless links may also be implemented. Carrier waves, such as acoustic waves and electromagnetic waves, including radio, optical and infrared waves travel through space without wires or cables. Signals include man-made variations in amplitude, frequency, phase, polarization or other physical properties of carrier waves. For wireless links, the communications interface 1370 sends and receives electrical, acoustic or electromagnetic signals, including infrared and optical signals, that carry information streams, such as digital data.

The term computer-readable medium is used herein to refer to any medium that participates in providing information to processor 1302, including instructions for execution. Such a medium may take many forms, including, but not limited to, non-volatile media, volatile media and transmission media. Non-volatile media include, for example, optical or magnetic disks, such as storage device 1308. Volatile media include, for example, dynamic memory 1304. Transmission media include, for example, coaxial cables, copper wire, fiber optic cables, and waves that travel through space without wires or cables, such as acoustic waves and electromagnetic waves, including radio, optical and infrared waves. The term computer-readable storage medium is used herein to refer to any medium that participates in providing information to processor 1302, except for transmission media.

Common forms of computer-readable media include, for example, a floppy disk, a flexible disk, a hard disk, a magnetic tape, or any other magnetic medium, a compact disk ROM (CD-ROM), a digital video disk (DVD) or any other optical medium, punch cards, paper tape, or any other physical medium with patterns of holes, a RAM, a programmable ROM (PROM), an erasable PROM (EPROM), a FLASH-EPROM, or any other memory chip or cartridge, a carrier wave, or any other medium from which a computer can read. The term non-transitory computer-readable storage medium is used herein to refer to any medium that participates in providing information to processor 1302, except for carrier waves and other signals.

Logic encoded in one or more tangible media includes one or both of processor instructions on a computer-readable storage media and special purpose hardware, such as ASIC 1320.

Network link 1378 typically provides information communication through one or more networks to other devices that use or process the information. For example, network link 1378 may provide a connection through local network 1380 to a host computer 1382 or to equipment 1384 operated by an Internet Service Provider (ISP). ISP equipment 1384 in turn provides data communication services through the public, world-wide packet-switching communication network of networks now commonly referred to as the Internet 1390. A computer called a server 1392 connected to the Internet provides a service in response to information received over the Internet. For example, server 1392 provides information representing video data for presentation at display 1314.

The invention is related to the use of computer system 1300 for implementing the techniques described herein. According to one embodiment of the invention, those techniques are performed by computer system 1300 in response to processor 1302 executing one or more sequences of one or more instructions contained in memory 1304. Such instructions, also called software and program code, may be read into memory 1304 from another computer-readable medium such as storage device 1308. Execution of the sequences of instructions contained in memory 1304 causes processor 1302 to perform the method steps described herein. In alternative embodiments, hardware, such as application specific integrated circuit 1320, may be used in place of or in combination with software to implement the invention. Thus, embodiments of the invention are not limited to any specific combination of hardware and software.

The signals transmitted over network link 1378 and other networks through communications interface 1370, carry information to and from computer system 1300. Computer system 1300 can send and receive information, including program code, through the networks 1380, 1390 among others, through network link 1378 and communications interface 1370. In an example using the Internet 1390, a server 1392 transmits program code for a particular application, requested by a message sent from computer 1300, through Internet 1390, ISP equipment 1384, local network 1380 and communications interface 1370. The received code may be executed by processor 1302 as it is received, or may be stored in storage device 1308 or other non-volatile storage for later execution, or both. In this manner, computer system 1300 may obtain application program code in the form of a signal on a carrier wave.

Various forms of computer readable media may be involved in carrying one or more sequence of instructions or data or both to processor 1302 for execution. For example, instructions and data may initially be carried on a magnetic disk of a remote computer such as host 1382. The remote computer loads the instructions and data into its dynamic memory and sends the instructions and data over a telephone line using a modem. A modem local to the computer system 1300 receives the instructions and data on a telephone line and uses an infra-red transmitter to convert the instructions and data to a signal on an infra-red a carrier wave serving as the network link 1378. An infrared detector serving as communications interface 1370 receives the instructions and data carried in the infrared signal and places information representing the instructions and data onto bus 1310. Bus 1310 carries the information to memory 1304 from which processor 1302 retrieves and executes the instructions using some of the data sent with the instructions. The instructions and data received in memory 1304 may optionally be stored on storage device 1308, either before or after execution by the processor 1302.

Figure 14:
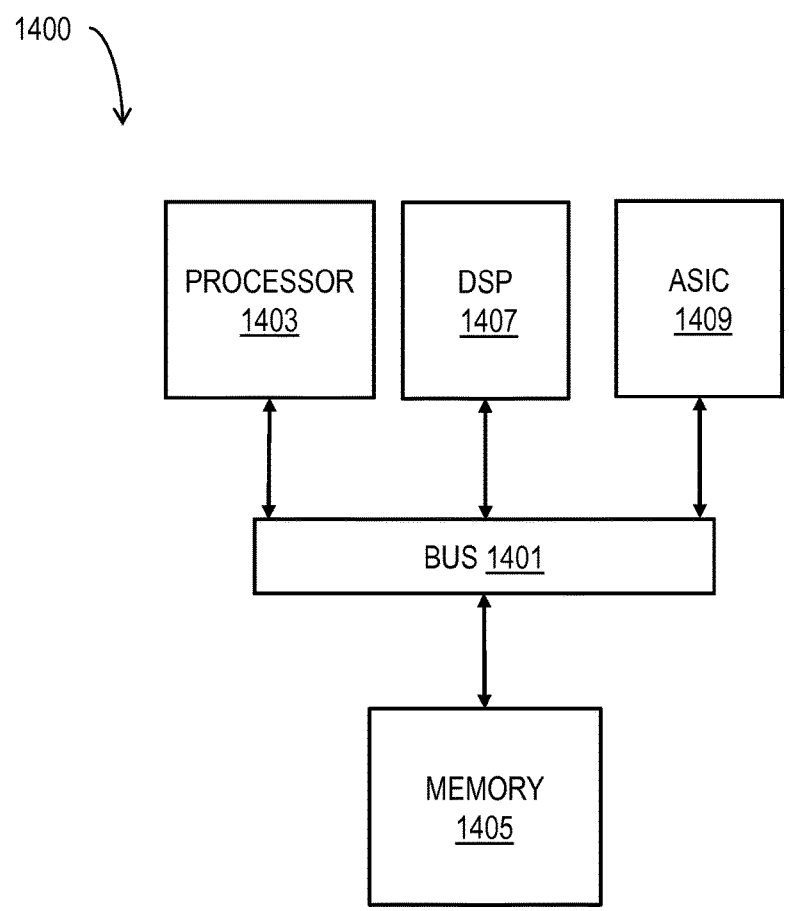
FIG. 14 illustrates a chip set upon which an embodiment of the invention may be implemented.

FIG. 14 illustrates a chip set 1400 upon which an embodiment of the invention may be implemented. Chip set 1400 is programmed to perform one or more steps of a method described herein and includes, for instance, the processor and memory components described with respect to FIG. 13 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 1400, or a portion thereof, constitutes a means for performing one or more steps of a method described herein.

In one embodiment, the chip set 1400 includes a communication mechanism such as a bus 1401 for passing information among the components of the chip set 1400. A processor 1403 has connectivity to the bus 1401 to execute instructions and process information stored in, for example, a memory 1405. The processor 1403 may include one or more processing cores with each core configured to perform independently. A multi-core processor enables multiprocessing within a single physical package. Examples of a multi-core processor include two, four, eight, or greater numbers of processing cores. Alternatively or in addition, the processor 1403 may include one or more microprocessors configured in tandem via the bus 1401 to enable independent execution of instructions, pipelining, and multithreading. The processor 1403 may also be accompanied with one or more specialized components to perform certain processing functions and tasks such as one or more digital signal processors (DSP) 1407, or one or more application-specific integrated circuits (ASIC) 1409. A DSP 1407 typically is configured to process real-world signals (e.g., sound) in real time independently of the processor 1403. Similarly, an ASIC 1409 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1403 and accompanying components have connectivity to the memory 1405 via the bus 1401. The memory 1405 includes both dynamic memory (e.g., RAM, magnetic disk, writable optical disk, etc.) and static memory (e.g., ROM, CD-ROM, etc.) for storing executable instructions that when executed perform one or more steps of a method described herein. The memory 1405 also stores the data associated with or generated by the execution of one or more steps of the methods described herein.

6. EXTENSIONS, MODIFICATIONS AND ALTERNATIVES

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense. Throughout this specification and the claims, unless the context requires otherwise, the word "comprise" and its variations, such as "comprises" and "comprising," will be understood to imply the inclusion of a stated item, element or step or group of items, elements or steps but not the exclusion of any other item, element or step or group of items, elements or steps. Furthermore, the indefinite article "a" or "an" is meant to indicate one or more of the item, element or step modified by the article.

7. REFERENCES

Brox, T. and Weickert, J., "Level set segmentation with multiple regions," *IEEE Transactions on Image Processing*, vol. 15, pp. 3213-3218, 2006.

Caselles, V., R. Kimmel, and G. Sapiro, "Geodesic Active contour model," *International Journal of Computer Vision*, vol. 22, pp. 61-79, 1997.

Chan, T. F., and L. A. Vese, "Active contour model without edges," *IEEE Transactions on* Image Processing, vol. 10, pp. 266-277, 2001.

Falco, A. X., J. Stolfi, and R. De Alencar Lotufo, "The Image Foresting Transform: Theory, Algorithms, and Applications," *IEEE Transactions on Pattern Analysis and Machine Intelligence*, vol. 26, pp. 19-29, 2004

Kass, M., A. Witkin, and D. Terzopoulos, "Snakes: Active contour models," *International Journal of Computer Vision*, vol. 1, pp. 321-331, 1988.

Lankton, S. and Tannenbaum, A., "Localizing region-based active contour model," *IEEE Transactions on Image Processing*, vol. 17, pp. 2029-2039, 2008.

Meyer, F. "Topographic distance and watershed lines." Signal Processing 38(1): 113-125, 1994.

Mumford, D., and J. Shah, "Optimal approximations by piecewise smooth functions and associated variational problems," *Comm. Pure Appl. Math., vol.* 42, pp. 577-685, 1989.

Osher, S., and J. A. Sethian, "Fronts propagating with curvature-dependent speed: Algorithms based on Hamilton-Jacobi formulations," *Journal of Computational Physics*, vol. 79, pp. 12-49, 1988.

What is claimed is:

1. A method comprising:

obtaining, on a processor, image data that indicates amplitude values at each of a plurality of voxels;

determining a watershed transform of the plurality of voxels;

obtaining, on a processor, initial boundary data that indicates an initial position of a first boundary associated with a first object represented by the image data and an initial position of a different second boundary associated with a different second object represented by the image data;

determining a first marker that indicates a first amplitude value inside the first object; determining a second marker that indicates a second amplitude value inside the second object;

determining, based on the watershed transform, a predecessor map that labels voxels each with data indicating a different voxel that is a predecessor on a path of steepest descent from a watershed line of the watershed transform, wherein one voxel on the watershed line satisfies that it is on the watershed line separating catchment basins of at least two minima and it is an upstream voxel of the other voxels;

determining, on a processor, a first topographical distance between a voxel on at least one boundary and the first marker;

determining, on a processor, a second topographical distance between the voxel and the second marker, wherein determining at least one of the first or the second topographical distance further comprises determining at least one of the first or the second topographical distance based at least in part on the predecessor map;

moving at least one of the first boundary and the second boundary, thereby forming a moved boundary, by evaluating an evolution equation that includes a boundary force that includes a difference in the first topographical distance and the second topographical distance for each voxel on the at least one boundary, and also includes at least one other term related to boundary detection; and presenting automatically on a display device the moved boundary.

2. The method as recited in claim 1 wherein:

said moving the at least one of the first boundary and the second boundary further comprises evaluating an evolution equation that includes a first difference of amplitude values for voxels on the at least one of the first boundary and the second boundary from a statistical metric of amplitude of voxels inside the at least one of the first boundary and the second boundary and a second difference of amplitude values for voxels on the at least one of the first boundary and the second boundary from a statistical metric of amplitude of voxels outside the at least one of the first boundary and the second boundary for a limited region that lies within a distance r of the boundary, and r is small compared to a perimeter of at least one of the first boundary and the second boundary.

3. The method as recited in claim 1, wherein obtaining the initial boundary data further comprises obtaining the initial boundary data by propagating a boundary determined on a different subset of the voxels of the image data.

4. The method as recited in claim 1, wherein obtaining the initial boundary data further comprises receiving a boundary for which at least a subset of the boundary is based on manually edited data received in response to a prompt for a manual edit presented in a graphical user interface for operation by a human user.

5. The method as recited in claim 1, wherein obtaining image data that indicates amplitude values at each of a plurality of voxels further comprises obtaining image data that indicates amplitude values at each of the plurality of voxels and that excludes voxels outside a region of interest.

6. The method as recited in claim 5, wherein the region of interest is based on data received in response to a prompt for a manual region of interest presented in a graphical user interface for operation by a human user.

7. The method as recited in claim 1, wherein:

the initial boundary data is determined in a first subset of the image data; and the method further comprising propagating the position of the at least one of the first boundary and the second boundary to a different subset of the voxels of the image data.

8. A method comprising:

obtaining, on a processor, image data that indicates amplitude values at each of a plurality of voxels;

obtaining, on a processor, initial boundary data that indicates an initial position of a first boundary associated with a first object represented by the image data and an initial position of a different second boundary associated with a different second object represented by the image data;

determining a first marker that indicates a first amplitude value inside the first object;

determining a second marker that indicates a second amplitude value inside the second object;

determining, on a processor, a first topographical distance between a voxel on at least one boundary and the first marker;

determining, on a processor, a second topographical distance between the voxel and the second marker;

moving at least one of the first boundary and the second boundary, thereby forming a moved boundary, by evaluating an evolution equation that includes a boundary force that includes a difference in the first topographical distance and the second topographical distance for each voxel on the at least one boundary, and also includes at least one other term related to boundary detection, wherein the difference in the first topographical distance and the second topographical distance for each voxel on the at least one boundary is multiplied by a term that depends on distance between the first boundary and the second boundary; and presenting automatically on a display device the moved boundary.

9. The method as recited in claim 8, wherein:

said moving the at least one of the first boundary and the second boundary further comprises evaluating an evolution equation that includes a first difference of amplitude values for voxels on the at least one of the first boundary and the second boundary from a statistical metric of amplitude of voxels inside the at least one of the first boundary and the second boundary and a second difference of amplitude values for voxels on the at least one of the first boundary and the second boundary from a statistical metric of amplitude of voxels outside the at least one of the first boundary and the second boundary for a limited region that lies within a distance r of the boundary, and r is small compared to a perimeter of at least one of the first boundary and the second boundary.

10. The method as recited in claim 8, wherein obtaining the initial boundary data further comprises obtaining the initial boundary data by propagating a boundary determined on a different subset of the voxels of the image data.

11. The method as recited in claim 8, wherein obtaining the initial boundary data further comprises receiving a boundary for which a least of subset of the boundary is based on manually edited data received in response to a prompt for a manual edit presented in a graphical user interface for operation by a human user.

12. The method as recited in claim 8, wherein obtaining image data that indicates amplitude values at each of a plurality of voxels further comprises obtaining image data that indicates amplitude values at each of the plurality of voxels and that excludes voxels outside a region of interest.

13. The method as recited in claim 12, wherein the region of interest is based on data received in response to a prompt for a manual region of interest presented in a graphical user interface for operation by a human user.

14. The method as recited in claim 8, wherein:

the initial boundary data is determined in a first subset of the image data; and the method further comprising propagating the position of the at least one of the first boundary and the second boundary to a different subset of the voxels of the image data.

15. A non-transitory computer-readable medium carrying one or more sequences of instructions, wherein execution of the one or more sequences of instructions by one or more processors causes the one or more processors to perform the steps of:

obtaining image data that indicates amplitude values at each of a plurality of voxels;

obtaining initial boundary data that indicates an initial position of first boundary associated with a first object represented by the image data and an initial position of a different second boundary associated with a different second object represented by the image data;

determining a watershed transform for the plurality of voxels;

determining a first marker that indicates a first amplitude value inside the first object;

determining a second marker that indicates a second amplitude value inside the second object;

determining, based on the watershed transform, a predecessor map that labels voxels each with data indicating a different voxel that is a predecessor on a path of steepest descent from a watershed line of the watershed transform, wherein one voxel on the watershed line satisfies that it is on the watershed line separating catchment basins of at least two minima and it is an upstream voxel of the other voxels;

determining a first topographical distance between each voxel and the first marker;

determining a second topographical distance between each voxel and the second marker, wherein determining at least one of the first or the second topographical distance further comprises determining at least one of the first or the second topographical distance based at least in part on the predecessor map;

moving at least one of the first boundary and the second boundary, thereby forming a moved boundary, by evaluating an evolution equation that includes a boundary force that includes a difference in the first topographical distance and the second topographical distance for each voxel on the at least one boundary, and also includes at least one other term related to boundary detection; and presenting on a display device the moved boundary.

16. A system comprising:

at least one processor; and at least one memory including one or more sequences of instructions, the at least one memory and the one or more sequences of instructions configured to, with the at least one processor, cause an apparatus to perform at least the following, obtain image data that indicates amplitude values at each of a plurality of voxels;

determine a watershed transform for the plurality of voxels;

obtain initial boundary data that indicates an initial position of first boundary associated with a first object represented by the image data and an initial position of a different second boundary associated with a different second object represented by the image data;

determine a first marker that indicates a first amplitude value inside the first object, determine a second marker that indicates a second amplitude value inside the second object;

determine, based on the watershed transform, a predecessor map that labels voxels each with data indicating a different voxel that is a predecessor on a path of steepest descent from a watershed line of the watershed transform, wherein one voxel on the watershed line satisfies that it is on the watershed line separating catchment basins of at least two minima and it is an upstream voxel of the other voxels;

determine a first topographical distance between each voxel and the first marker;

determine a second topographical distance between each voxel and the second marker, wherein determining at least one of the first or the second topographical distance further comprises determining at least one of the first or the second topographical distance based at least in part on the predecessor map; and move at least one of the first boundary and the second boundary, thereby forming a moved boundary, by evaluating an evolution equation that includes a boundary force that includes a difference in the first topographical distance and the second topographical distance for each voxel on the at least one boundary, and also includes at least one other term related to boundary detection; and presenting on a display device the moved boundary.

17. A non-transitory computer-readable medium carrying one or more sequences of instructions, wherein execution of the one or more sequences of instructions by one or more processors causes the one or more processors to perform the steps of:

obtaining image data that indicates amplitude values at each of a plurality of voxels;

obtaining initial boundary data that indicates an initial position of a first boundary associated with a first object represented by the image data and an initial position of a different second boundary associated with a different second object represented by the image data;

determining a first marker that indicates a first amplitude value inside the first object;

determining a second marker that indicates a second amplitude value inside the second object;

determining a first topographical distance between a voxel on at least one boundary and the first marker;

determining a second topographical distance between the voxel and the second marker;

moving at least one of the first boundary and the second boundary, thereby forming a moved boundary, by evaluating an evolution equation that includes a boundary force that includes a difference in the first topographical distance and the second topographical distance for each voxel on the at least one boundary, and also includes at least one other term related to boundary detection; and presenting on a display device the moved boundary, wherein the difference in the first topographical distance and the second topographical distances for each voxel on the at least one boundary is multiplied by a term that depends on distance between the first boundary and the second boundary.

18. A system comprising:

at least one processor; and at least one memory including one or more sequences of instructions, the at least one memory and the one or more sequences of instructions configured to, with the at least one processor, cause an apparatus to perform at least the following, obtain image data that indicates amplitude values at each of a plurality of voxels;

obtain initial boundary data that indicates an initial position of a first boundary associated with a first object represented by the image data and an initial position of a different second boundary associated with a different second object represented by the image data;

determine a first marker that indicates a first amplitude value inside the first object;

determine a second marker that indicates a second amplitude value inside the second object;

determine a first topographical distance between a voxel on at least one boundary and the first marker;

determine a second topographical distance between the voxel and the second marker;

moving at least one of the first boundary and the second boundary, thereby forming a moved boundary, by evaluating an evolution equation that includes a boundary force that includes a difference in the first topographical distance and the second topographical distance for each voxel on the at least one boundary, and also includes at least one other term related to boundary detection; and presenting automatically on a display device the moved boundary, wherein the difference in the first topographical distance and the second topographical distance for each voxel on the at least one boundary is multiplied by a term that depends on distance between the first boundary and the second boundary.

* * * * *